US007807909B2

(12) United States Patent
Suzuki

(10) Patent No.: US 7,807,909 B2
(45) Date of Patent: Oct. 5, 2010

(54) MUSICAL INSTRUMENT AND SUPPORTING SYSTEM INCORPORATED THEREIN FOR MUSIC PLAYERS

(75) Inventor: Hideo Suzuki, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 11/763,032

(22) Filed: Jun. 14, 2007

(65) Prior Publication Data

US 2008/0017014 A1 Jan. 24, 2008

(30) Foreign Application Priority Data

Jul. 20, 2006 (JP) ............................ 2006-197791

(51) Int. Cl.
*G10F 1/02* (2006.01)
*G10D 7/00* (2006.01)
*G01P 3/00* (2006.01)

(52) U.S. Cl. .............................. 84/385 R; 84/3; 84/19; 84/83; 84/380 R; 84/422.1; 84/602; 84/626

(58) Field of Classification Search ................ 84/385 R
See application file for complete search history.

(56) References Cited

U.S. PATENT DOCUMENTS

| | | | | |
|---|---|---|---|---|
| 1,880,961 | A | 10/1932 | Kingsley | |
| 2,301,184 | A * | 11/1942 | Arnold | 84/742 |
| 3,767,833 | A * | 10/1973 | Noble et al. | 84/673 |
| 4,527,456 | A | 7/1985 | Perkins et al. | |
| 4,899,631 | A | 2/1990 | Baker | |
| 4,957,029 | A | 9/1990 | Kähönen et al. | |
| 4,981,457 | A | 1/1991 | Iimura et al. | |
| 4,993,307 | A * | 2/1991 | Sakashita | 84/615 |
| 5,149,904 | A | 9/1992 | Kamiya et al. | |
| 5,276,272 | A * | 1/1994 | Masuda | 84/600 |
| 5,300,729 | A * | 4/1994 | Tokunaga et al. | 84/657 |
| 5,403,966 | A * | 4/1995 | Kawashima et al. | 84/613 |
| 5,668,340 | A | 9/1997 | Hashizume et al. | |
| 5,929,361 | A * | 7/1999 | Tanaka | 84/742 |
| 7,049,503 | B2 * | 5/2006 | Onozawa et al. | 84/723 |
| 7,112,735 | B2 | 9/2006 | Shire | |
| 7,402,738 | B2 | 7/2008 | Sawada et al. | |
| 2005/0076774 | A1 | 4/2005 | Sakurada | |
| 2005/0098020 | A1 | 5/2005 | Glazer | |
| 2005/0126367 | A1 | 6/2005 | Bonnat | |

(Continued)

FOREIGN PATENT DOCUMENTS

| | | |
|---|---|---|
| DE | 38 06 396 | 9/1989 |

(Continued)

*Primary Examiner*—Jeffrey Donels
*Assistant Examiner*—Christopher Uhlir
(74) *Attorney, Agent, or Firm*—Dickstein Shapiro LLP

(57) ABSTRACT

A saxophone is equipped with a supporting system, and the supporting system assists a player in performance on the saxophone; the supporting system includes pressure sensors respectively adhered to the keys of the saxophone, torque motors provided in association with the keys for exerting assisting force on the keys and a controller for adjusting a driving signal to a certain amount corresponding to the pressure; since a conversion table is stored in the controller, the controller looks up the amount of driving current to be adjusted in the conversion table, and supplies the driving signal to the torque motor, whereby the keys are depressed by the total of finger force and assisting force.

18 Claims, 11 Drawing Sheets

U.S. PATENT DOCUMENTS

| | | | |
|---|---|---|---|
| 2005/0145100 | A1 | 7/2005 | Ramstein |
| 2005/0204906 | A1 | 9/2005 | Lengeling |
| 2005/0217464 | A1 | 10/2005 | Onozawa et al. |
| 2006/0090633 | A1 | 5/2006 | Muramatsu |
| 2006/0185503 | A1 | 8/2006 | Fujiwara |
| 2007/0234887 | A1 | 10/2007 | Sawada et al. |
| 2007/0277666 | A1 | 12/2007 | Laukat et al. |
| 2008/0017014 | A1 | 1/2008 | Suzuki |

FOREIGN PATENT DOCUMENTS

| | | | |
|---|---|---|---|
| EP | 1840869 | | 10/2007 |
| GB | 1 004 311 | | 9/1965 |
| JP | 03-091800 | A | 4/1991 |
| JP | 06-222752 | | 8/1994 |
| JP | 10254437 | A | 9/1998 |
| JP | 2001-109462 | | 4/2001 |
| JP | 2004-177828 | | 6/2004 |
| JP | 2004-334141 | | 11/2004 |
| JP | 2006-084010 | | 3/2006 |
| JP | 2006-154505 | | 6/2006 |
| NL | 1011954 | | 7/2000 |
| NL | 1011954 | | 11/2000 |

* cited by examiner

TB1

| PRESSURE | THE AMOUNT OF CURRENT |
|---|---|
| a1 | b1 |
| a2 | b2 |
| a3 | b3 |
| a4 | b4 |
| a5 | b5 |
| ⋮ | ⋮ |

$a1 < a2 < a3 < a4 < a5$ $b1 < b2 < b3 < b4 < b5$

TB2

| PRESSURE | THE AMOUNT OF CURRENT |
|---|---|
| c1 | d1 |
| c2 | d2 |
| c3 | d3 |
| c4 | d4 |
| c5 | d5 |
| ⋮ | ⋮ |

c1 < c2 < c3 < c4 < c5 d1 < d2 < d3 < d4 < d5

| PRESSURE | THE AMOUNT OF CURRENT |
|---|---|
| e1 | f1 |
| e2 | f2 |
| e3 | f3 |
| e4 | f4 |
| e5 | f5 |
| ⋮ | ⋮ |

TB3

$e1<e2<e3<e4<e5$ $f1<f2<f3<f4<f5$

MUSICAL INSTRUMENT AND SUPPORTING SYSTEM INCORPORATED THEREIN FOR MUSIC PLAYERS

FIELD OF THE INVENTION

This invention relates to a musical instrument and, more particularly, to a musical instrument equipped with a supporting system for music players and the supporting system for making it easy to perform a music passage on the musical instrument.

DESCRIPTION OF THE RELATED ART

Musical instruments are usually designed for non-handicapped grown-up persons. For example, grow-up persons have their legs long enough to step on the pedals of a piano during the fingering on the keyboard. The grown-up persons can quickly depress the keys of a wind instrument against the elastic force of the return springs. However, some children have their legs too short to step on the pedals of the piano, and feel the pedals too far from their feet. Physically handicapped persons are sometimes in the situation same as that of the children in front of the musical instruments.

Various supporting apparatus and supporting systems have been proposed for the children and physically handicapped persons. One of the prior art supporting systems is disclosed in Japan Patent Application laid-open No. 2001-109462, and is hereinafter referred to as the "first prior art supporting system". The first prior art supporting system is designed for persons, who feel the pedals of standard grand pianos too far from their feet. The first prior art supporting system is fitted to the lyre post, and is provided with assistant pedals changed between their assisting positions and idling positions. While a grown-up person is playing a music passage on the grand piano, the assistant pedals are maintained at the idling positions so that the grown-up person directly steps on the pedals.

When a person, who needs the assistance, wishes to play a music passage on the grand piano, the assistant pedals are changed to the assisting positions so as to be linked with the pedals of grand piano. While the person is playing the music passage on the grand piano, the person steps on the assistant pedals for the artificial expressions. The assistant pedals make the pedals of grand piano pressed down. Thus, the person imparts the artificial expressions to the tones as if he or she directly steps of the pedals of grand piano. When the person removes the force from the assistant pedals, the pedals of grand piano are recovered to the rest positions by virtue of the weight of component parts of the piano linked with the pedals, and, accordingly, cause the assistant pedals to return to their rest positions.

Another prior art supporting system is disclosed in Japan Patent Application laid-open No. 2004-334141, and is hereinafter referred to as the "second prior art supporting system." The second prior art supporting system is also used for a person who wishes to play a musical passage on a piano, and is portable. The second prior art supporting system aims at providing the assistance to persons who feel the pedals of the piano too far from their feet.

The second prior art supporting system is broken down into a footrest, assistant pedals and linkworks. The assistant pedals are hinged to the footrest, and are connectable to the pedals of piano by means of the associated linkworks. While the person is fingering on the keyboard without any step-on on the pedals, he or she rests the feet on the footrest. When the person wishes to impart the artificial expressions to the tones, he or she moves his or her foot from the footrest to the assistant pedal, and steps on the assistant pedal. Then, the force is transmitted from the assistant pedal through the linkwork to the pedal of piano, and makes the pedal pressed down. When the person removes the force from the assistant pedal, the pedal of piano is recovered to the rest position by virtue of the weight of component parts of the piano linked with the pedal, and causes the assistant pedal to return to the rest position.

Thus, the first prior art supporting system and second prior art supporting system fill the gap between the feet of short persons and the pedals of pianos, and assist the short persons in their performances on the pianos. However, the weakness is not taken into account. In detail, some children have their legs not only too short to step on the pedals but also too weak sufficiently to depress the assistant pedals together with the pedals of pianos. Although the first prior art supporting system and second prior art supporting system permit the children to make up the gap between their feet and the pedals of piano, it is impossible for the first prior art supporting system and second prior art supporting system to supplement the small muscular strength of children.

The above-described problem is also encountered in performances on percussion instruments such as, for example, a floor tom and on wind musical instruments such as, for example, a saxophone.

SUMMARY OF THE INVENTION

It is therefore an important object of the present invention to provide a musical instrument, which renders assistance in performance to a person who merely has the small muscular strength.

It is also an important object of the present invention to provide a supporting system, which is to be incorporated in the musical instrument.

To accomplish the object, the present invention proposes to exert assisting force on a manipulator so as to make the manipulator to be moved by the total of player's force and assisting force.

In accordance with one aspect of the present invention, there is provided a musical instrument for producing music sound comprising at least one manipulator moved in a certain direction by player's force so as to specify an attribute for the music sound to be produced, a tone generator connected to the at least one manipulator and producing the music sound having the attribute, and a supporting system including at least one sensor provided for the at least one manipulator and producing a detecting signal representative of a physical quantity expressing the movement of the at least one manipulator, at least one actuator responsive to a driving power so as to exert assisting force causing the at least one manipulator to move in the certain direction on the at least one manipulator and a controller connected to the at least one sensor and the at least one actuator, storing a relation between the physical quantity and a magnitude of the driving power and adjusting the driving power to a certain magnitude corresponding to the physical quantity so that said at least one manipulator is moved by the total of the player's force and the assisting force.

In accordance with another aspect of the present invention, there is provided a supporting system for assisting a player in performance on a musical instrument comprising at least one sensor provided at least one manipulator of the musical instrument and producing a detecting signal representative of a physical quantity expressing a movement of the at least one manipulator in a certain direction, at least one actuator responsive to a driving power so as to exert assisting force causing the at least one manipulator to move in the certain direction on the at least one manipulator, and a controller connected to the at least one sensor and the at least one actuator, storing a relation between the physical quantity and a magnitude of the driving power and adjusting the driving power to a certain magnitude corresponding to the physical quantity so that said at least one manipulator is moved by the total of the player's force and the assisting force.

BRIEF DESCRIPTION OF THE DRAWINGS

The features and advantages of the musical instrument and supporting system will be more clearly understood from the following description taken in conjunction with the accompanying drawings, in which.

DESCRIPTION OF THE PREFERRED EMBODIMENTS

A musical instrument embodying the present invention is used for producing music sound, and largely comprises at least one manipulator, a tone generator and a supporting system. The at least one manipulator is moved in a certain direction by player's force, and the player specifies an attribute for the music sound to be produced through the at least one manipulator. The tone generator is connected to the at least one manipulator. The tone generator is responsive to the movement of at least one manipulator so as to produce the music sound, and the specified attribute is imparted to the music sound.

The supporting system includes at least one sensor, at least one actuator and a controller. The at least one sensor is provided for the at least one manipulator, and produces a detecting signal representative of a physical quantity expressing the movement of the at least one manipulator. The at least one actuator is responsive to a driving power so as to exert assisting force on the at least one manipulator. The assisting force causes the at least one manipulator to move in the certain direction together with the player's force. The controller is connected to the at least one sensor and the at least one actuator. A relation between the physical quantity and a magnitude of the driving power is stored in the controller. When the detecting signal reaches the controller, the controller determines a value of the physical quantity, and checks the relation to determine the magnitude of driving power corresponding to the value of physical quantity. The controller adjusts the driving power to the certain magnitude, which is corresponding to the total of player's force and assisting force, and supplies the driving power to the actuator. Thus, the supporting system adds the assisting force to the player's force, and makes it possible that the player lightly moves the at least one manipulator.

Only the supporting system may be offered to users. The user combines the supporting system with a musical instrument already owned by him or her, and retrofits the standard musical instrument to the musical instrument of the present invention.

First Embodiment

Figure 1:
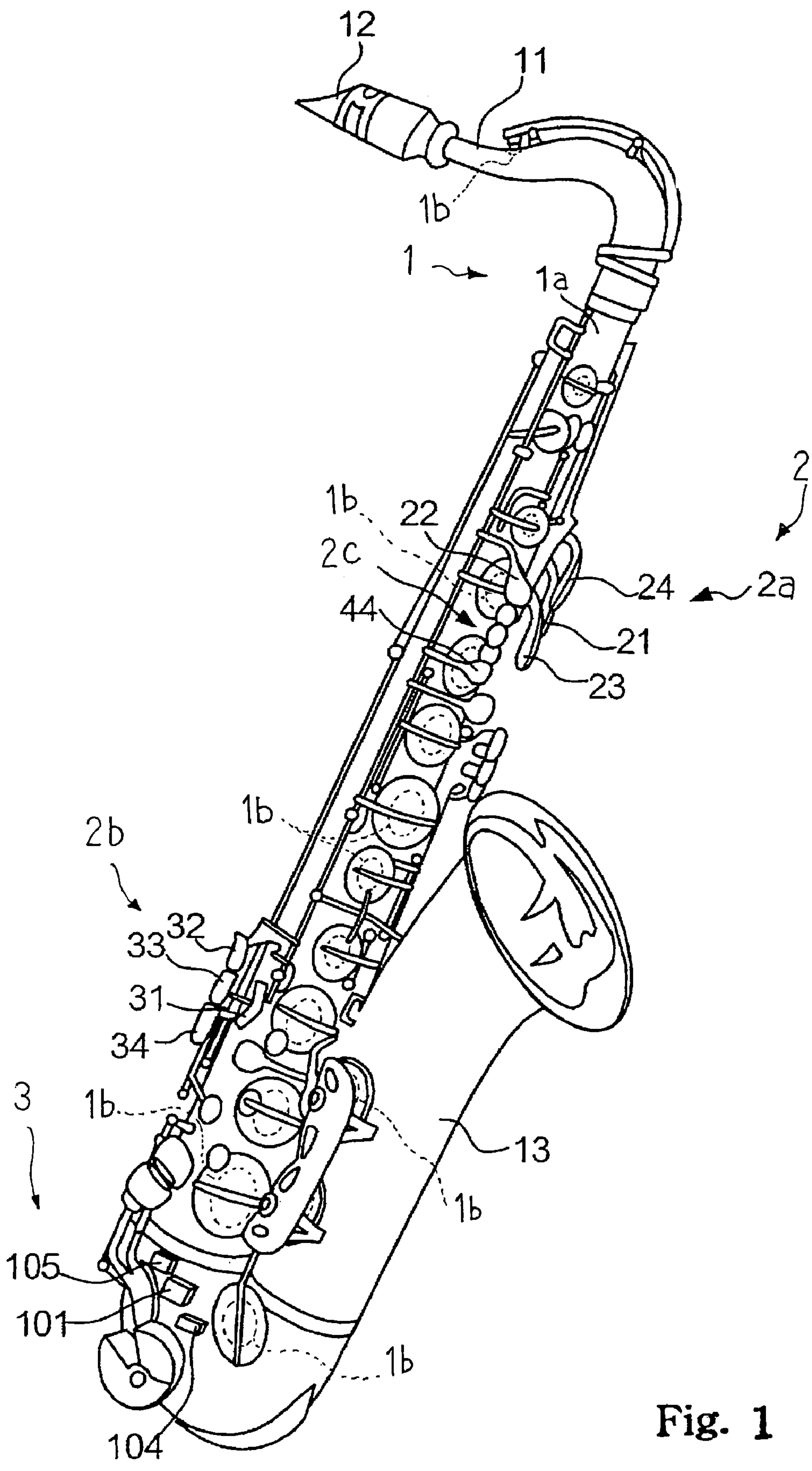
FIG. 1 is a perspective view showing a saxophone of the present invention.

Referring first to FIG. 1 of the drawings, a saxophone embodying the present invention largely comprises a tubular body 1, a key mechanism 2 and a supporting system 3. A column of air is defined in the tubular body 1, and a player gives rise to vibrations of the air column in the tubular body 1. Tones are radiated from the tubular body 1 through the vibrations of air column. The key mechanism 2 is provided on the outer surface of the tubular body 1, and the player fingers on the key mechanism 2 for changing the length of air column, i.e., the pitch of the tones. The supporting system 3 is provided in association with the key mechanism 2, and assists the player in fingering on the key mechanism 2. For this reason, even if the player is weak in fingering, he or she can quickly change the pitch of tones with the assistance of the supporting system 3.

The tubular body 1 includes a conical metal tube 1*a*, a neck 11, a mouthpiece 12 with a reed and an upturned flared bell 13. Tone holes are formed in the conical metal tube 1*a*, neck 11 and upturned bell 13, and several tone holes are labeled with "1*b*" in FIG. 1. The mouthpiece 12 is taken in player's mouth. While the player is blowing on the mouthpiece 12, the reed gives rise to vibrations of air column in the tubular body 1.

The neck 11 is connected between the mouthpiece 12 and the conical metal tube 1*a*, and the upturned flare bell 13 is connected to the other end of the conical metal tube 1*a*. The inner space of the neck 11 is continued to the inner space of the conical metal tube 1*a*, and the inner space of conical metal tube 1*a* is continued to the inner space of the upturned flare bell 13. The upturned flare bell 13 is open to the atmosphere. Thus, the column of air is defined in the neck 11, conical metal tube 1*a* and upturned flare bell 13, and is excited in the presence of the vibrations of reed.

The key mechanism 2 includes a side key group for left hand 2*a*, a side key group for right hand 2*b* and a center key group for left hand 2*c*. A high-D key 21, a high-F key 23 and a high-Eb key 24 belong to the side key group for left hand 2*a*, and the side key group for right hand 2*b* contains a high-D trill key 31, a high-E key 32, a side C lever 33 and a side Bb lever 34. A C key 22 and an A key 44 are incorporated in the center key group for left hand 2*c*. The side keys such as the C side key 33 and Bb side key 34 are depressed with the fingers moved from the center keys thereonto before being depressed. The player usually rests his or her fingers on the center keys. For this reason, the player depresses the center keys without any movement from other keys.

Figures 2, 3:
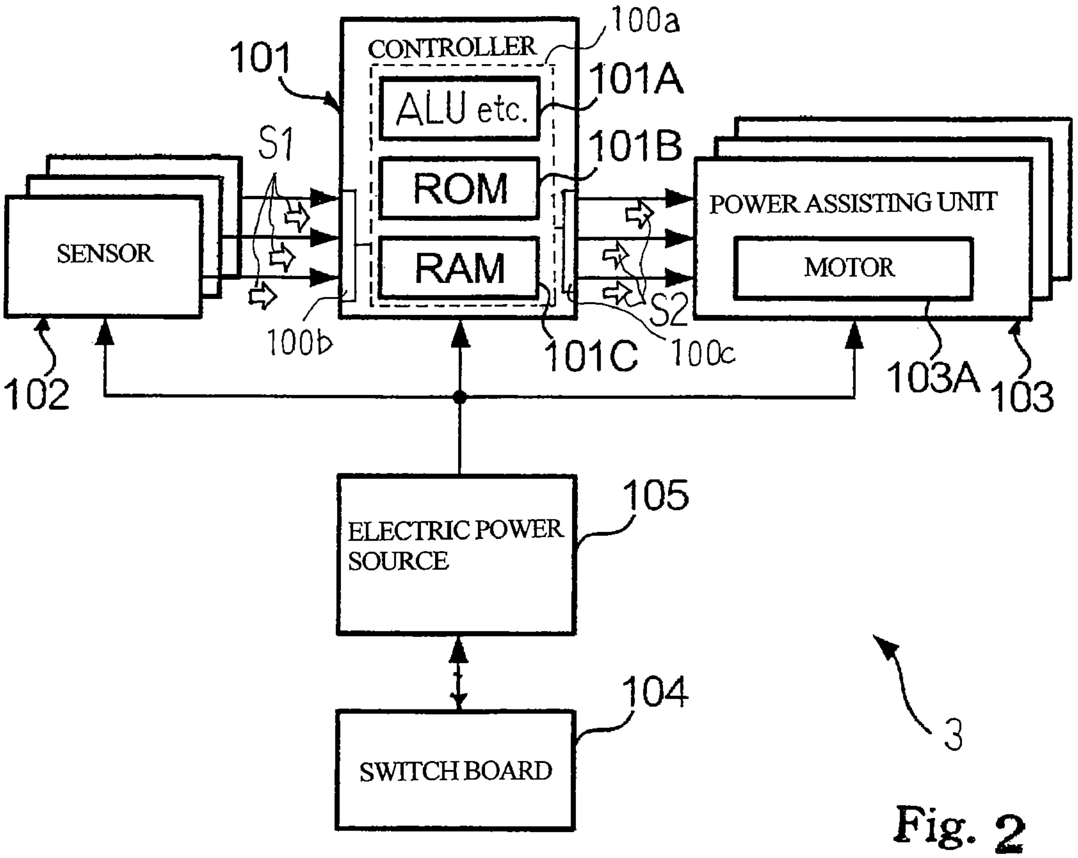
FIG. 2 is a block diagram showing the system configuration of a supporting system incorporated in the saxophone.
FIG. 3 is a view showing a relation between pressure and the amount of current stored in a conversion table.

The supporting system 3 is mounted on the outer surface of the tubular body 1, and includes a controller 101, plural sensors 102, plural power-assisting units 103, a switch board 104 and an electric power source 105 as shown in FIG. 2. The electric power source 105 has power transistors connected to the controller 101, sensors 102 and power assisting units 103, and the controller 101, sensors 102 and power-assisting units 103 are connected to the current-output nodes of the power transistors. In this instance, the power assisting units 103 are provided for the high-D key 21, high-F key 23 and high-Eb key 24 of the key group 2*a* for the left hand as will be hereinlater described.

The switch board 104 has an on-off switch, which is equipped with a sliding knob, and the sliding knob is moved between an on-position and an off-position. The on-off switch is connected to the control-nodes of the power transistors. While the sliding knob is staying at the off-position, the on-off switch keeps a control signal inactive, and the inactive control signals makes the power transistors turn off. On the other hand, when the sliding knob is changed to the on-position, the on-off switch changes the control signal to the active level, and the active control signal causes the power transistors to turn on. As a result, the electric power is supplied from the electric power source 105 to the controller 101, sensors 102 and power assisting units 103.

The sensors 102 are implemented by sheets of pressure-sensitive film, and are connected to the controller 101. The sheets of pressure-sensitive film are adhered to the keys of the key mechanism 2, and are varied in resistivity depending upon pressure exerted thereon. Since the electric power source 105 applies a certain potential to the sheets of pressure-sensitive film, the potential level at controller 101 is varied depending upon the pressure exerted on the sheets of pressure-sensitive film. Thus, the sensors 102 convert the pressure exerted thereon to analog detecting signals S1, respectively.

The power assisting units 103 are provided in association with the aforementioned keys 21, 23 and 24 of the key mechanism 2, and are driven with control signals S2 selectively to make the tone holes 1*b* open and closed with pads. Each of the power-assisting units 103 has a torque motor 103A, and the torque output from the torque motor 103A is under the control of the controller 101.

The controller 101 includes an information processing system 100*a*, signal input circuits 100*b* and signal output circuits 100*c*. The sensors 102 are connected in parallel to the signal input circuits 100*b*, and the signal input circuits 100*b* have analog-to-digital converters and input data buffers. The detecting signals S1 are periodically sampled, and sampled discrete values are converted to digital detecting signals representative of the pressure. The digital detecting signals are temporarily stored in the data buffers. The signal output circuits 100*c* are connected in parallel to the power assisting units 103, and have output data buffers. The control signals S2 are supplied from the output data buffers to the power assisting units 103. Though not shown, the power assisting units 103 have current driving circuits, respectively, and the current driving circuits are responsive to the control signals S2 so as to supply the electric current to the torque motors 103A. The electric current is adjusted to the amount expressed by the control signals S2.

The information processing system 100*a* is connected to the signal input circuit 100*b* and signal output circuits 100*c*. The information processing system 100*a* periodically fetches the digital detecting signals, and checks the binary numbers to see whether or not a player varies the force on the keys. While the player is keeping the pitch of tone unchanged, the answer is given negative, and the information processing system 100*a* maintains the control signals S2. On the other hand, if the player changes the depressed keys and/or released keys, the information processing system 100*a* determines the tone holes 1*b* to be closed and/or opened, and changes the control signals S2.

The information processing system 100*a* includes an arithmetic and logic unit/signal control 101A, a read only memory 101B and a random access memory 101C. Although the arithmetic and logic unit/instruction decoder/signal control 101A, read only memory 101B and random access memory 101C and other system components are connected to an internal shared bus system, the other system components and internal shared bus system are not shown in FIG. 2. The arithmetic and logic unit/instruction decoder/signal control 101A, read only memory 101B and random access memory 101C are respectively abbreviated as "ALU", "ROM" and "RAM" in FIG. 2.

Instruction codes and a conversion table TB1 are stored in the read only memory 101B, and the random access memory 101C offers a working area to the arithmetic and logic unit 101A. A relation between the pressure and the amount of current to be supplied to the torque motors 103A is expressed in the conversion table TB1, and FIG. 3 shows the relation between the pressure and the amount of current. The values a1, a2, a3, a4, a5, . . . of pressure are respectively correlated with the values b1, b2, b3, b4, b5, . . . of the amount of current in the conversion table. The pressure is stepwise increased from a1 through a2, a3, a4, a5, . . . , and the amount of current is also stepwise increased from b1, through b2, b3, b4, b5, . . . . For example, when the detecting signal S1 expresses the pressure a1, the control signal S2 is to be adjusted to b1.

Figure 4:
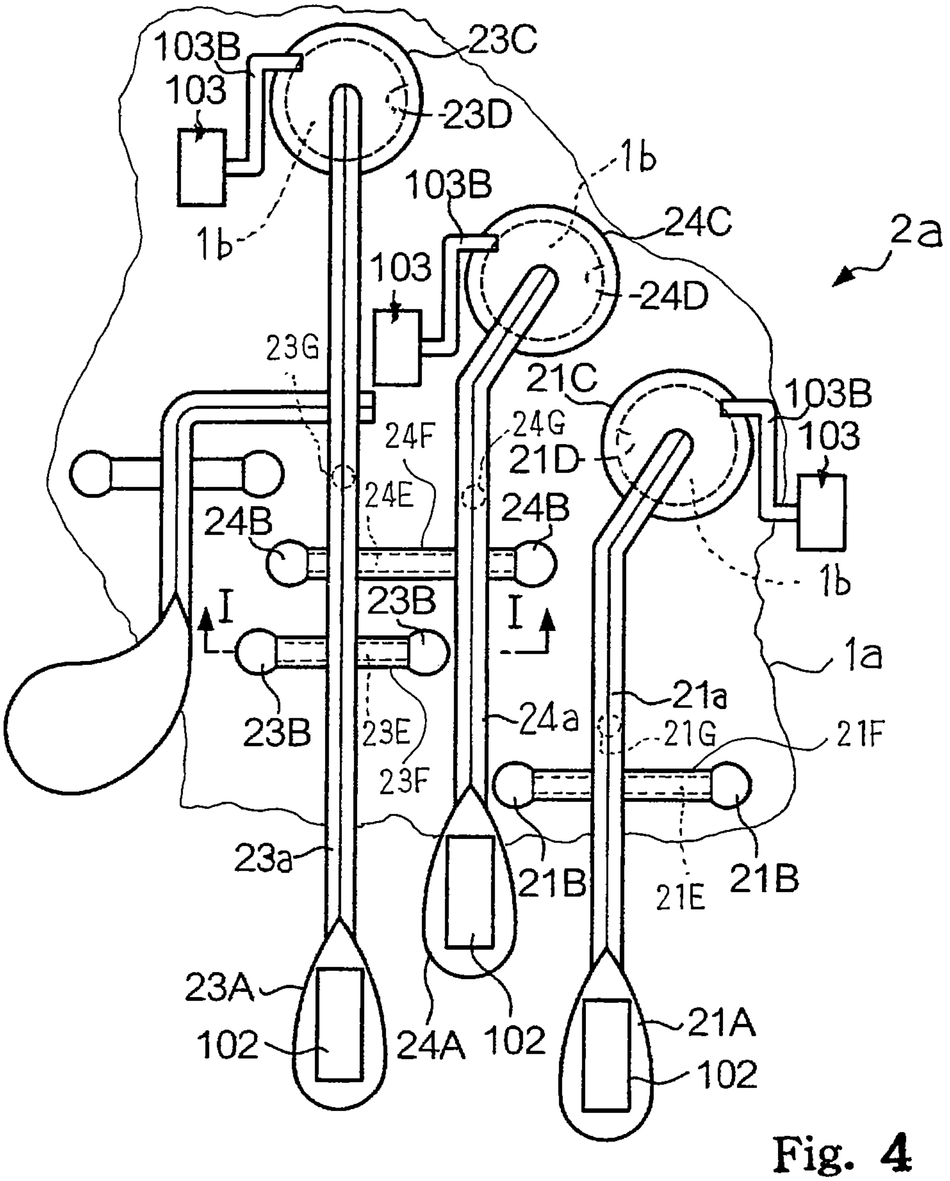
FIG. 4 is a plane view showing a part of a key mechanism incorporated in the saxophone.
Figure 5:
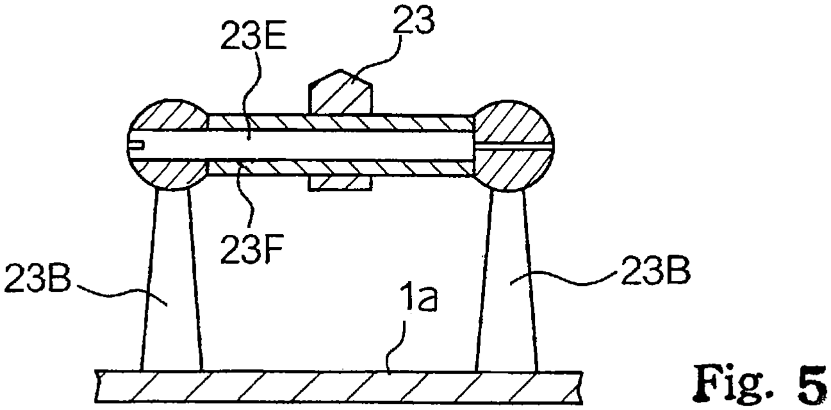
FIG. 5 is a cross sectional view taken along line I-I of FIG. 4 and showing the structure of a key.
Figure 6A:
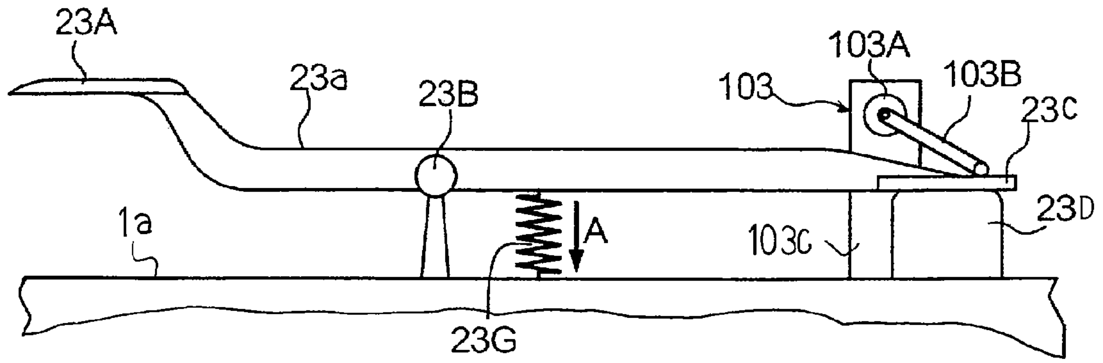
FIGS. 6A and 6B are side views showing a power assisting unit for a key at different key positions.
Figure 6B:
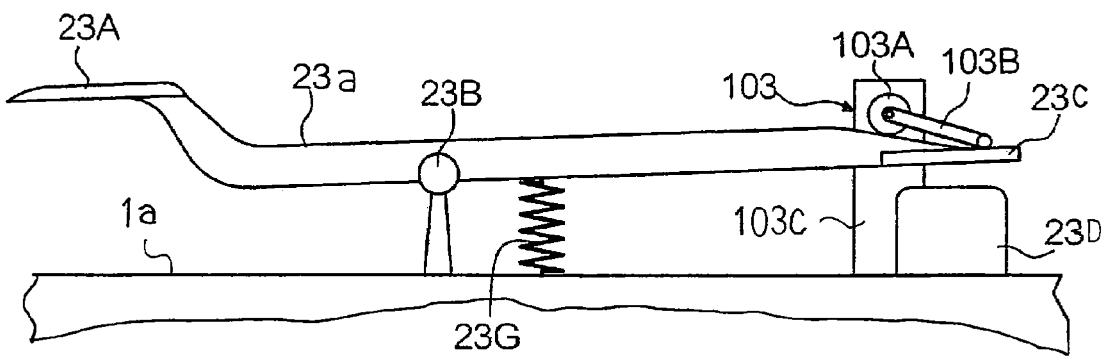

FIG. 4 shows three key sub-mechanisms incorporated in the key group for left hand 2*a* and the power assisting units 103 provided for the key sub-mechanisms. The high-D key 21, high-F key 23 and high-Eb key 24 are respectively incorporated in the sub-key mechanisms. FIG. 5 shows the cross section taken along line I-I of FIG. 4, and FIGS. 6A and 6B show the high-F key 23 viewed from the high-Eb key 24.

The tone holes 1*b* are surrounded by tone hole chimney 21D, 23D and 24D in FIG. 4, and the tone hole chimney 21D, 23D and 24D are secured to the outer surface of the conical metal tube 1*a*.

The key sub-mechanism includes a touch piece 21A, 23A or 24A, a pair of key posts 21B, 23B or 24B, the key rod 21*a*, 23*a* or 24*a*, a padded cup 21C, 23C or 24C, a rod 21E, 23E or 24E, a key sleeve 21F, 23F or 24F and a return spring 21G, 23G or 24G. As will be better seen in FIG. 5, the key posts 21B, 23B or 24B of each pair are upright on the outer surface of the conical metal tube 1*a*, and are spaced from each other. The rod 21E, 23E or 24E bridges the gap between the key posts 21B, 23B or 24B, and is secured to the key posts 21B, 23B or 24B.

The key sleeve 21F, 23F or 24F is rotatably supported by the rod 21E, 23E or 24E, and the key rod 21*a*, 23*a* or 24*a* is secured to the key sleeve 21F, 23F or 24F. The key rod 21*a*, 23*a* or 24*a* crosses the rod 21E, 23E or 24E at right angle, and is connected at one end thereof to the touch piece 21A, 23A or 24A and at the other end thereof to the padded cup 21C, 23C or 24C. The rod 21E, 23E or 24E offers an axis of rotation to the key rod 21*a*, 23*a* or 24*a* so that the key rod 21*a*, 23*a* or 24*a* pitches up and down. The padded cup 21C, 23C or 24C is provided over the tone hole chimney 21C, 23C or 24C, and is brought into contact with and spaced from the tone hole chimney 21D, 23D or 24D. Thus, the tone hole 1*b* is closed with the padded cup 21C, 23C or 24C, and is opened to the atmosphere.

The return spring 21G, 23G or 24G is provided between the outer surface of the conical metal tube 1*a* and the key rod 21*a*, 23*a* or 24*a*, and urges the key rod 21, 23 or 24 in the direction indicated by arrow A. For this reason, the padded cup 21C, 23C or 24C are held in contact with the tone hole chimney 21D, 23D or 24D at the rest position thereof, and the tone hole 1*b* is closed with the padded cup 21C, 23C or 24C. When a player wishes to open the tone hole 1*b*, he or she depresses the touch piece 21A, 23A or 24A against the elastic force of the return spring 21G, 23G or 24G. Then, the padded cup 21C, 23C or 24C is lifted over the tone hole chimney 21D, 23D or 24D, and the tone hole 1*b* is opened to the atmosphere.

The sensors 102 are respectively adhered to the touch pieces 21A, 23A and 24A, and the power assisting units 103 are respectively provided in the vicinity of the padded cups 21C, 23C and 24C. Each of the power assisting units 103 is upright on the outer surface of the conical metal tube 1*a* as shown in FIGS. 6A and 6B. The torque motor 103A is fitted to a housing 103C over the padded cup 21C, 23C or 24C, and a crank 103B is connected to the output shaft of the torque motor 103A. The other end of the crank 103B is connected to the padded cup 21C, 23C or 24C.

While the electric power is being applied to the torque motor 103A, the torque motor 103A rotates the output shaft in the counter clockwise direction in FIGS. 6A and 6B so that the elastic force of return spring 21G, 23G or 24G is partially canceled. When the total of the moment due to the force exerted on the touch piece 23A and the torque generated by the torque motor 103A exceeds the elastic force of the return spring 21G, 23G or 24G, the padded cup 21C, 23C or 24C is upwardly moved from the tone hole chimney 21D, 23D or 24D as shown in FIG. 6B, and the tone hole 1*b* is open to the atmosphere. When the total of the moment and torque becomes less than the elastic force of the return spring 21G, 23G or 24G, the return spring 21G, 23G or 24G urges the key rod 21*a*, 23*a* or 24*a* in the clockwise direction, and causes the padded cup 21C, 23C or 24C to be brought into contact with the tone hole chimney 21D, 23D or 24D as shown in FIG. 6A.

Subsequently, description is made on how the power assisting units 103 assist a player in performance on the saxophone. In the following description, the force exerted by the player with his or her fingers is hereinafter referred to as “finger force”, and the moment at the padded cup 21C, 23C or 24C about the rod 21E, 23E or 24E due to the finger force is referred to as “finger moment”. The moment at the padded cup 21C, 23C or 24C about the rod 21E, 23E and 24E due to the elastic force of return string 21G, 23G or 24G is hereinafter referred to as “elastic moment”. The force exerted on the padded cup 21C, 23C or 24C by the torque motor 103A is referred to as “assisting force”, and the moment at the padded cup 21C, 23C or 24C about the rod 21E, 23E and 24E due to the assisting force is referred to as “assisting moment”. The total of finger moment and assisting moment is referred to as “resultant moment”, and the resultant moment forces the padded cup 21C, 23C or 24C to leave the tone hole chimney 21D, 23D or 24D. In case where the supporting system 3 is inactive, the resultant moment is equal to the finger moment. On the other hand, in case where the supporting system 3 is active, the resultant moment is equal to the total of finger moment and assisting moment.

Figure 7:
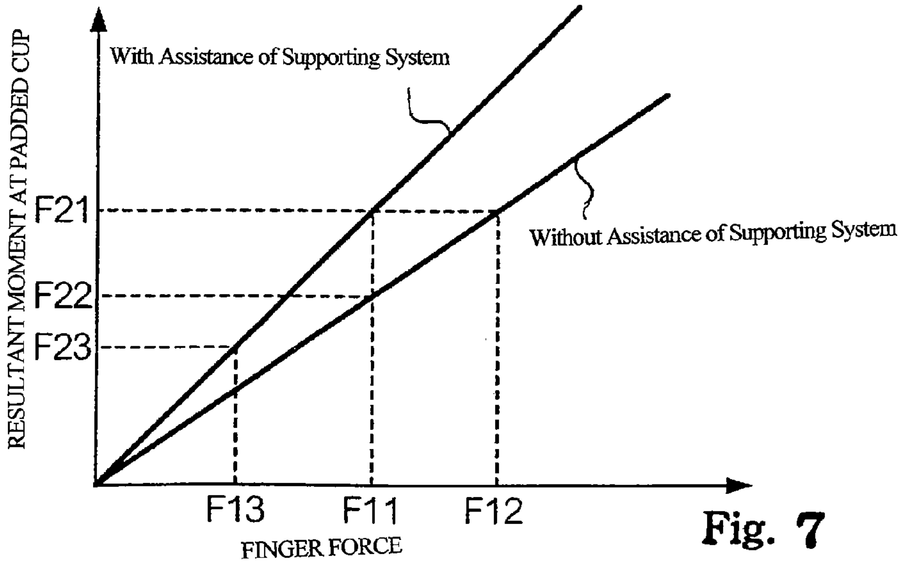
FIG. 7 is a graph showing resultant moment at a padded cup in terms of force exerted on a touch piece.

FIG. 7 shows the behavior of the high-F key 23. Plots PL1 is indicative of resultant moment at the padded cup 23C in terms of the finger force without any assistance of the power assisting unit 103, and plots PL2 is indicative of the resultant moment at the padded cup 23C with the assistance of the power assisting unit 103. The high-F key 23 is designed in such a manner that, when the resultant moment reaches F21, the padded cup 23C starts to leave the tone hole chimney 23D.

The player is assumed to turn off the on-off switch on the switch board 104. The power transistors of the electric power source 105 are turned off, and the electric power is not supplied to the sensors 102, controller 101 and power assisting units 103. The torque motor 103A does not exert any assisting force on the padded cup 23C, and the tone hole 1*b* is to be opened by the player without any assistance of the power assisting unit 103.

While the player is not forcing the touch piece 23A with his or her finger, the return spring 23G exerts the elastic force on the key rod 23*a* in the direction indicated by arrow A, and makes the padded cup 23C pressed to the tone hole chimney 23D.

The player is assumed to exert the finger force F11 on the touch piece 23A. Although the elastic moment is partially canceled with the finger moment, the tone hole 1*b* is still closed with the padded cup 23C, because the resultant moment F22 is less than F21.

The player increases the finger force on the finger piece 23A. When the finger force reaches F12, the resultant moment reaches F21, and causes the padded cup 23C to start to leave the tone hole chimney 23D. As a result, the tone hole 1*b* is opened.

When the player releases his or her finger from the touch piece 23A, the finger moment is decreased to zero, and the elastic moment causes the padded cup 23C to be brought into contact with the tone hole chimney 23D. Thus, the tone hole 1*b* is closed with the padded cup 23C.

On the other hand, the high-F key 23 behaves as follows on the condition that the supporting system 3 is active.

The player is assumed to put his or her finger on the touch piece 23A. The touch piece 23A is lightly pressed with the finger at the finger force F13, and the sensor 102 changes the detecting signal S1 to a certain potential level representative of the finger force F13. The certain potential level is converted to the digital detecting signal through the signal input circuit 100*b*, and the piece of data information expressed by the digital detecting signal is fetched by the information processing system 100*a*. The finger force F13 is equivalent to “a2” in the conversion table TB1, and the amount of current b2 is correlated with the finger force F13. Therefore, the amount of current b2 is read out from the conversion table TB1, and the information processing unit 100*a* requests the signal output circuit 100*c* to make the control signal S2 express the amount of current b2. The current driving circuit of the power assisting unit 103 is responsive to the control signal S2 so that the electric current flows through the torque motor 103A at b2. The assisting force is applied to the padded cup 23C. The assisting moment is added to the finger moment, and the resultant moment reaches F23. However, the resultant moment F23 is less than F21. The padded cup 23C is still held in contact with the tone hole chimney 23D.

The player increases the finger force from F13 to F11. The sensor 102 increases the detecting signal S1 to another potential level expressing the finger force F11, and the detecting signal S1 is converted to the digital detecting signal expressing the finger force F11. The information processing system 100*a* fetches the piece of data information expressing the finger force F11 from the signal input circuit 100*b*. The finger force F11 is equivalent to a3. Then, the amount of current b3 is read out from the conversion table TB1. The information processing system 100*a* requests the signal output circuit 100*c* to supply the control signal S2 representative of the amount of current b3 to the power assisting unit 103. The amount of current is increased from b2 to b3, and, accordingly, the torque motor 103A increases the assisting force. The total of finger moment and assisting moment becomes greater than the elastic force. In other words, the resultant force reaches F21. For this reason, the padded cup 23C starts to leave the tone hole chimney 23D, and the tone hole 1*b* is opened to the atmosphere.

The player is assumed to close the tone hole 1*b* with the padded cup 23C. The player reduces the finger force on the touch piece 23A, and the sensor 102 determines that the finger force is reduced from F11 to F13, and the detecting signal S1 representative of the finger force F13 is supplied from the sensor 102 to the signal input circuit 100*b*.

The amount of current b2 is read out from the conversion table TB1, and the information processing system 100*a* requests the signal output circuit 100*c* to supply the control signal S2 representative of the amount of current b2 to the power assisting unit 103. The assisting force at the padded cup 23C is reduced, and, accordingly, the resultant moment is reduced to F23. As a result, the padded cup 23C is rotated toward the tone hole chimney 23D, and is brought into contact with the tone hole chimney 23D. Thus, the tone hole 1*b* is closed with the padded cup 23C.

As will be understood from the foregoing description, the power assisting units 103 assist the player in the performance by increasing the moment at the padded cups 21C, 23C and 24C. Even if the player is a child or a physically handicapped person, the player feels the keys light, and can open and close the tone holes 1*b* with the assistance of the power assisting units 103. Especially, while the player is performing a fast passage on the saxophone, the player appreciates the supporting system of the present invention.

Moreover, the supporting system 3 determines the magnitude of finger force by means of the pressure sensors 102, and varies the assisting force on the padded cups depending upon the magnitude of finger force. In other words, the assisting force is not exerted on the padded cups 21C, 23C and 24C in the on-off fashion. Therefore, the player feels the key touch natural.

Second Embodiment

Figure 8:
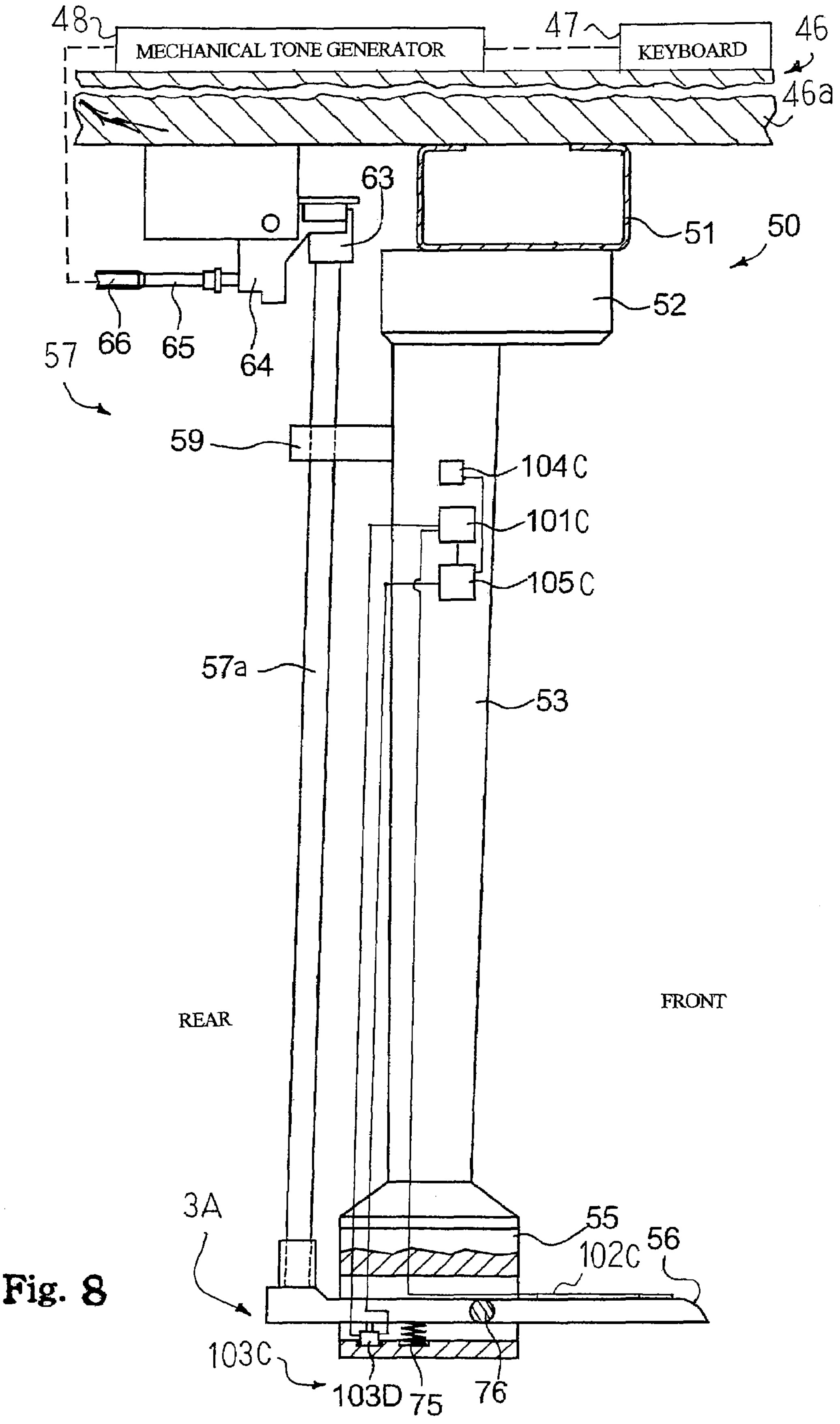
FIG. 8 is a side view showing the structure of a grand piano according to the present invention.

Turning to FIG. 8, a grand piano embodying the present invention largely comprises a piano cabinet 46, a keyboard 47, a mechanical tone generator 48, a pedal system 50 and a supporting system 3A. In the following description, term “front” is indicative of a position close to a player, who is sitting on a stool for fingering, than a position modified with term “rear”.

The keyboard 47, and mechanical tone generator 48 are accommodated in the piano cabinet 46, and the pedal system 50 is hung from the piano cabinet 46. A key bed 46*a* forms a part of the piano cabinet 46, and the keyboard 47 is mounted on the key bed 46*a*. The keyboard 47 is linked with the mechanical tone generator 48, and the pedal system 50 is also linked with the mechanical tone generator 48. The supporting system 3A is provided in association with the pedal system 50 for assisting a player in pedaling.

While a player is performing a music tune on the grand piano, he or she fingers on the keyboard 47 for specifying the tones to be produced through the mechanical tone generator 48. The fingering on the keyboard 47 is transmitted to the mechanical tone generator 48 so that the tones specified by the player are produced through the mechanical tone generator 48. Component parts of the mechanical tone generator 48 are called as action units, hammers, dampers and strings.

The player actuates the pedal system 50 with his or her foot or feet during the performance so as selectively to give predetermined effects to the tones. One of the effects is to prolong the tones, and another effect is to lessen the loudness of the tones. Since the player gives rise to mechanical movements in the mechanical tone generator 48 by using the pedal system 50, the player needs to put forth his or her strength. Therefore, the actuation of pedal system 50 is not easy for children and physically handicapped persons. The supporting system 3A assists the player in actuation so that a child or a physically handicapped person can easily actuate the pedal system 50.

The pedal system 50 includes a bottom beam 51, a lyre block 52, a lyre post 53, a lyre box 55, pedals 56 and a pedal link work 57. The bottom beam 51 is fixed to the key bed 46*a*, from which the lyre post 53 is hung. The lyre box is fitted to the lower end of the lyre post 53, and the pedals 56 are connected to the lyre box 55 by means of pedal dowels 76. The pedal dowels 76 offer axes of rotation to the pedals 56 so that the pedals 56 are independently rotatable. In this instance, the pedals 56 are called as a “damper pedal”, a “soft pedal” and a “sostenuto pedal”. A pianist steps on the front portions of the pedals 56 during his or her performance on the grand piano, and gives artificial expression to the performance.

The pedals 56 are connected to the mechanical tone generator 48 through the pedal link work 57, and a pianist gives rise to different actions of the mechanical tone generator 48 by means of the pedals 56. When the pianist steps on the damper pedal 56, the force is transmitted from the damper pedal 56 through the pedal link work 57 to the mechanical tone generator 48, and makes the mechanical tone generator 48 prolong the tones. The force, which is exerted on the soft pedal 56, is transmitted through the pedal link word 57 to the mechanical tone generator 48 so that the mechanical tone generator 48 lessen the loudness of the piano tones. The sostenuto pedal 56 is used for prolonging a tone or tones.

The pedal link work 57 includes pedal rods 57*a*, a lyre rod guide 59, capstan screws 63, levers 64, threaded rods 65 and nuts 66. The lyre rod guide 59 rearwardly projects from the rear surface of the lyre post 53, and is formed with through-holes. The through-holes are respectively assigned to the pedal rods 57*a*, and the pedal rods 57*a* pass through bearings (not shown) in the through-holes. For this reason, when a pianist steps on the front portions of the pedals 56, the rear portions of the pedals 56 makes the pedal rods 57*a* lifted.

The capstan screws 63 are secured to the upper end portions of the pedal rods 57*a*, and are connected to the levers 64. The threaded rods 65 are connected to the levers 64, and, in turn, are connected to the nuts 66. The upward movements of capstan screws 63 give rise to the movements of threaded rods 65 and nuts 66 through the levers 64. The movements of threaded rods 65 and nuts 66 are transmitted to the mechanical tone generator 48 through the other component parts of the pedal link work 57. Thus, a pianist selectively gives rise to the actions of mechanical tone generator 48 by means of the pedals 56. In other words, the pianist exerts the force on the pedals against the load due to the mechanical tone generator 48. The force, which is exerted on the pedal 56 by the player, is hereinafter referred to as "foot force", and the foot force gives rise to "foot moment" of the pedal 56. The force, which is due to the mechanical tone generator 48 against the foot force, is referred to as "load force", and the load force gives rise to "load moment" of the pedal 56. The load moment is opposite in di-reaction to the foot moment.

Figure 9A:
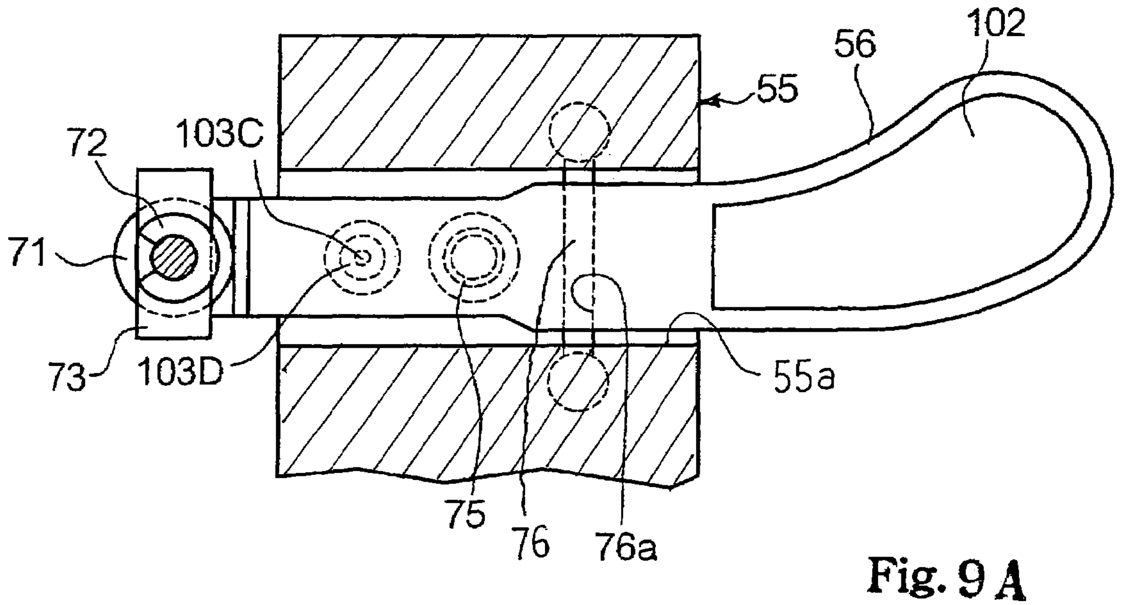
FIG. 9A is a plane view showing a damper pedal supported by a lyre box.
Figure 9B:
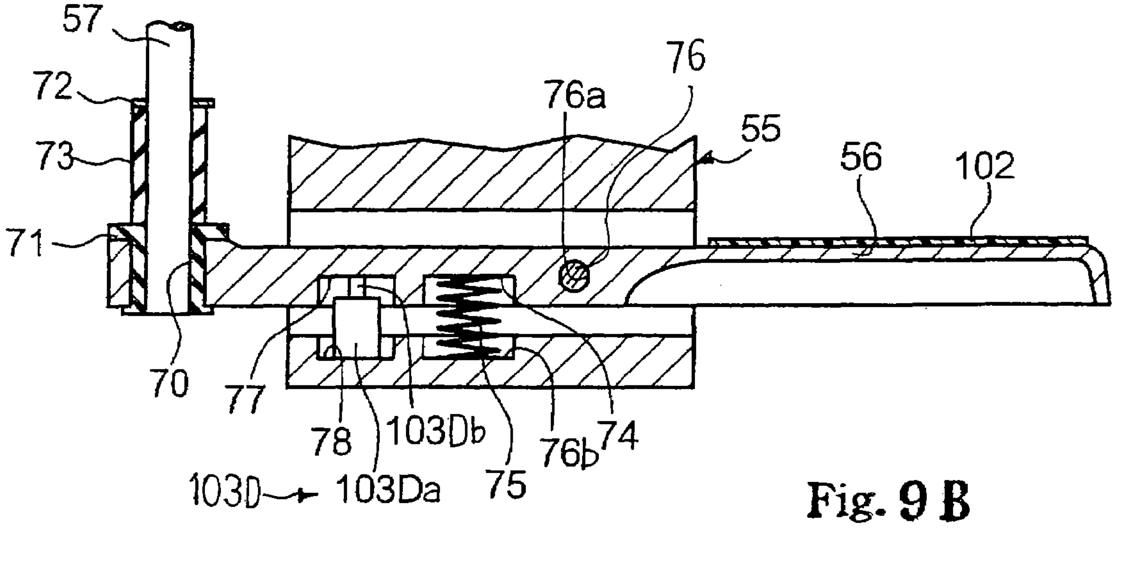
FIG. 9B is a cross sectional view showing the damper pedal and supporting structure in the lyre box.

Turning to FIGS. 9A and 9B, the damper pedal 56 is illustrated at a large magnification ratio. The lyre box 55 is formed with hollow spaces 55*a*, and the hollow spaces 55*a* are open to the front end surface and rear end surface of the lyre box 55. The hollow spaces 55*a* are respectively assigned to the three pedals 56, respectively. The pedals 56 loosely pass the hollow spaces 55*a*, and project from the front end surface and rear end surface of the lyre box 55. Only one of the hollow spaces 55*a*, which is assigned to the damper pedal 56, is seen in FIGS. 9A and 9B. Since the supporting structure of damper pedal 56 is similar to that of the other pedals 56, description is hereinafter focused on the supporting structure of damper pedal 56 for avoiding repetition.

The damper pedal 56 is formed with a through-hole 70, and the through-hole 70 has a circular cross section. A bush 71 is inserted into the through-hole 70, and is made of rubber. The bush 71 is formed with a pair of flanges, and the flanges prevent the bush 71 from being dropped off.

The bush 71 has an inner space, and the inner space is divided into an upper portion and a lower portion. The upper portion of inner space is upwardly diverged, and the lower portion of inner space is downwardly diverged. Thus, the inner space has the minimum diameter at the boundary between the upper portion and the lower portion. The lower portion of the pedal rod 57 is inserted in the bush 71, and the lower end surface of pedal rod 57 reaches the lower opening of the bush 71. The tapered inner space permits the damper pedal 56 to vary the angle between the centerline thereof and the centerline of pedal rod 57 during the movements of damper pedal 56.

A C-shaped stop ring 72 is secured to the pedal rod 57, and a sleeve 73 is inserted between the bush 71 and the C-shaped stop ring 72. The sleeve 73 is made of high-molecular synthetic resin or high-molecular synthetic rubber. The sleeve 73 has a generally elliptical column configuration, and the minor axis is directed in the up-and-down direction. The lower portion of the pedal rod 57 passes through the inner space of the sleeve 73. The bush 71, C-shaped stop ring 72 and sleeve 73 form parts of the pedal link work 57.

A through-hole 76*a* is formed in the damper pedal 56, and extends in the lateral direction. The pedal dowel 76 bridges the hollow space 55*a* in the lateral direction, and passes through the through-hole 76*a*. Thus, the pedal dowel 76 offers the axis of rotation to the damper pedal 56.

Recesses 74 and 77 are formed in the rear portion of the damper pedal 56, and are open to the lower surface of the damper pedal 56. Recesses 76*b* and 78 are formed in the lower portion of the lyre box 55, and are open to the hollow space 55*a*. The recesses 74 and 77 are respectively opposed to the recesses 76*b* and 78, and a coil spring 75 is provided between the bottom surface of the recess 74 and the bottom surface of the recess 76*b*. The coil spring 75 always urges the damper pedal 56 in the clockwise direction in FIG. 9B, and causes the capstan screw 63 to be held in contact with the lever 64 at all times.

When a pianist steps on the front portion of the damper pedal 56, he or she has to exert the foot force on the front portion of the damper pedal 56 in such a manner that the total of foot moment due to the foot force and the elastic moment becomes greater than load moment due to the downward force exerted on the pedal rod 57 by the mechanical tone generator 48. When the pianist removes the foot force from the front portion of damper pedal 56, the load moment becomes greater than the elastic moment, and gives rise to the rotation of damper pedal 56 in the counter clockwise direction in FIG. 9B. As a result, the damper pedal 56 returns to the rest position. Thus, the coil spring 75 partially cancels the load force exerted on the pedal rod 57*a*, and the coil spring 75 forms a part of the pedal link work 57.

Turning back to FIG. 8 of the drawings, the supporting system 3A includes a controller 101C, plural sensors 102C, plural power-assisting units 103C, a switch board 104C and an electric power source 105C. The controller 101C, plural power assisting units 103C, a switch board 104C and electric power source 105C are fitted to the lyre post 53, and the plural sensors 102C are adhered to the upper surfaces of the pedals 56.

Figures 10, 11:
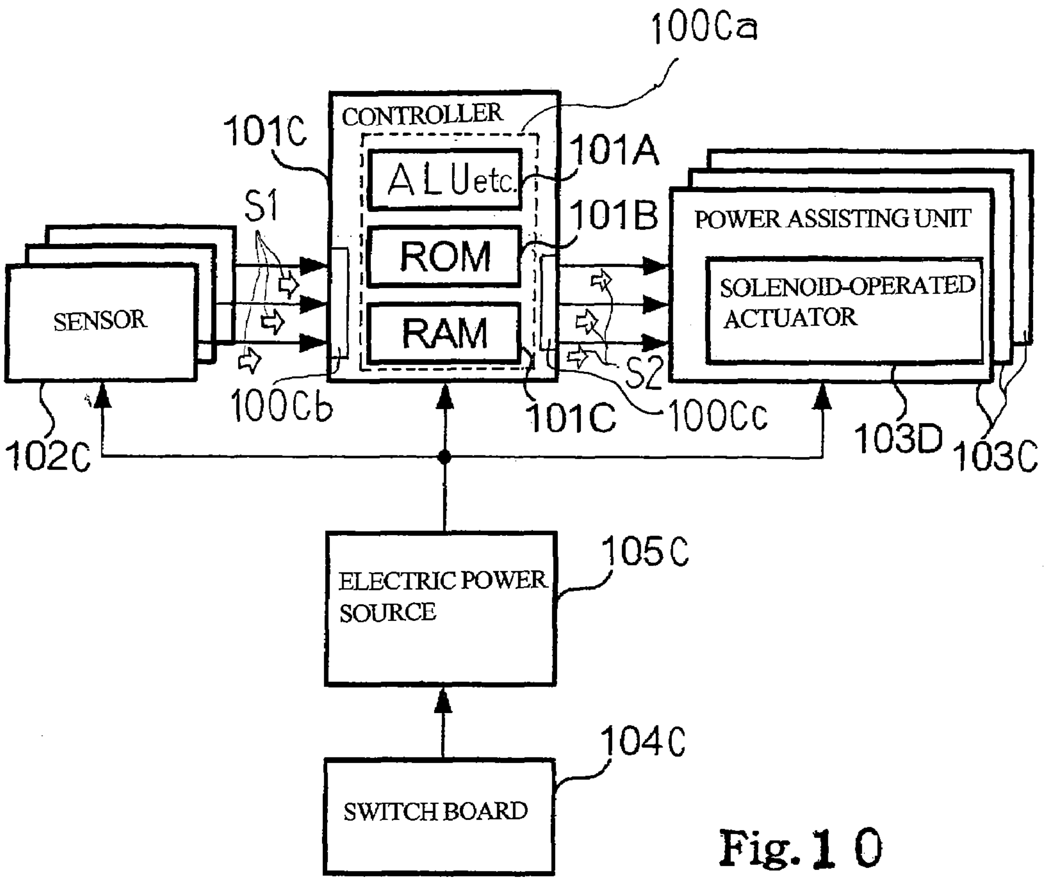
FIG. 10 is a block diagram showing the system configuration of another supporting system combined with the grand piano.
FIG. 11 is a view showing a relation between pressure and the amount of current stored in a conversion table of the supporting system.

As shown in FIG. 10, the switch board 104C is connected to the electric power source 105C, and electric power is distributed from the electric power source 105C to the sensors 102C, controller 101C and power assisting units 103C. The controller 101C includes an information processing system 100Ca, signal input circuits 100Cb and signal output circuits 100Cc. Since the sensors 102, switch board 104C, electric power source 105C, information processing system 100Ca, signal input circuits 100Cb and signal output circuits 100Cc are similar to the sensors 102, switch board 104, electric power source 105, information processing system 100*a*, signal input circuits 100*b* and signal output circuits 100*c*, description on those system components 102C, 104C, 105C, 100Ca, 100Cb and 100Cc is omitted for avoiding repetition, and system components of the information processing system 100*a* are labeled with references same as those designating the corresponding system components of the information processing system 100*a*. However, the power assisting units 103C are different from the power assisting units 103. For this reason, description is hereinafter focused on the power assisting units 103C.

Each of the power assisting units 103C includes a solenoid-operated actuator 103D instead of the torque motor 103A. The power assisting units 103C have current driving circuits (not shown), respectively, and the current driving circuits (not shown) are responsive to control signals S2 so as to adjust the electric current to a given value. The electric current is supplied from the driving circuits (not shown) to the solenoid-operated actuators 103D.

The solenoid-operated actuator 103D is provided between the bottom surface of the recess 78 and the bottom surface of the recess 77 of the associated pedal 56 as shown in FIG. 9B. Namely, the solenoid-operated actuator 103D has a solenoid wound on yoke 103Da and a plunger 103Db. The solenoid and yoke 103Da is partially received in the recess 78, and the plunger 103Db is projectable and retractable into the solenoid and yoke 103Da. The plunger 103Db is held at the upper end thereof in contact with the bottom surface of the recess 77. While the electric current flows through the solenoid 103Da, magnetic field is created around the plunger 103Db, and makes the plunger 103Db in the upward direction. Thus, the assisting force is exerted on the rear portion of the pedal 56 through the plunger 103Db. As a result, the assisting moment is exerted on the pedal 56 in the direction same as that of the foot moment.

FIG. 11 shows a relation between pressure applied onto the sensors 102C and the amount of current to be supplied to the solenoid 103Da. The relation is tabled, and is memorized in the read only memory 101B as a conversion table TB2. In this instance, the value of the pressure is increased from c1 through c2, c3 and c4 toward c5, and the amount of current is also increased from d1 through d2, d3 and d4 toward d5.

Figure 12:
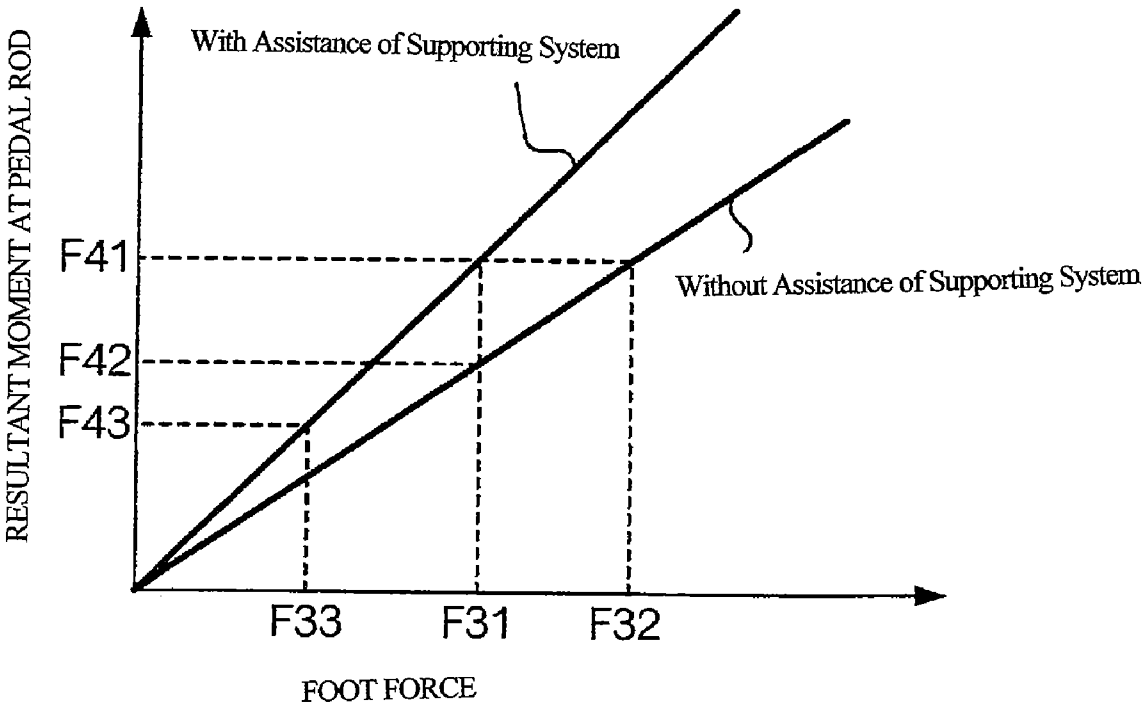
FIG. 12 is a graph showing resultant moment at a pedal rod in terms of force exerted on a pedal.

The supporting system 3A assists a pianist in performance, and description is hereinafter made on the behavior of the supporting system 3A. In case where the pianist turns off the on-off switch on the switch board 104C, the pianist gives rise to the movements of the mechanical tone generator 48 with only his or her feet. Although the coil spring 75 urge the pedals 56 in the clockwise direction in FIG. 9B, any assisting force is not exerted on the pedals 56. For this reason, the resultant moment is equal to the total of foot moment and elastic moment. In this instance, the mechanical tone generator 48 starts to move on the condition that the resultant force reaches F41. (See FIG. 12.)

While the pianist is leaving his or her feet off, the pedals 56 stays at the rest positions, because the load moment is greater than the elastic moment. The pianist is assumed to move his or her foot onto the damper pedal 56. The pianist exerts the foot force F31 on the damper pedal 56. The total of foot moment and elastic moment is exerted on the damper pedal 56 against the load moment. However, the resultant moment, i.e., the total of foot moment and elastic moment is F42, which is less than the resultant moment F41. For this reason, the damper pedal 56 still stays at the rest position.

The pianist increases the foot force to F32. The total of foot moment and elastic moment, i.e., the resultant moment reaches F41. As a result, the pedal rod 57 starts to be upwardly moved, and the mechanical tone generator 48 makes the tones prolonged.

The pianist is assumed to change the on-off switch on the switch board 104C to the on-position. The electric power source 105C starts to distribute the electric power to the sensors 102C, controller 101C and power assisting units 103C. First, the pianist exerts the foot force F33 on the damper pedal 56. The foot force F33 is equivalent to the pressure c2. The sensor 102C supplies the detecting signal S1 representative of the foot force F33 to the signal input circuit 100Cb, and the detecting signal S1 is converted to the digital detecting signal. The information processing system 100Ca fetches the digital detecting signal from the signal input circuit 100Cb, and accesses the conversion table TB2 with the pressure c2. The amount of current d2 is read out from the conversion table TB2, and is transferred from the information processing system 100Ca to the signal output circuit 100Cc. The control signal S2 is adjusted to the amount of current d2, and is supplied from the signal output circuit 100Cc to the current driving signal (not shown). The electric current is supplied from the current driving circuit (not shown) to the solenoid 100Da at d2. The plunger 100Db is urged in the electromagnetic field in the upward direction, and pushes the rear portion of the damper pedal 56. Thus, the solenoid-operated actuator 103D adds the assisting moment to the foot moment and elastic moment, and the resultant moment is equal to F43. However, the resultant moment F43 is less than the critical moment F41. For this reason, the damper pedal 56 still stays at the rest position.

The pianist increases the foot force from F33 to F31. The detecting signal S1 representative of F31 is converted to the digital detecting signal, and the information processing system 100Ca determines that the amount of current is to be increased to d3. The control signal S2 is adjusted to d3, and the electric current is supplied from the current driving circuit (not shown) to the solenoid-operated actuator 103D at d3. The solenoid-operated actuator 103D increases the assisting force. As a result, the total of foot moment, elastic moment and assisting moment, i.e., the resultant moment reaches F41. The pedal rod 57 starts to move in the upward direction so that the mechanical tone generator 48 makes the tone or tones prolonged.

When the pianist reduces the foot force from F31 through F33, the detecting signal S1 is representative of the foot force less than F31, and the pressure is decreased from the pressure c3. The detecting signal S1 is converted to the digital detecting signal, and the information processing system 100Ca looks up the target amount of current in the conversion table TB2. The target amount of current is less than d3 so that the electromagnetic field is weakened. As a result, the assisting force and, accordingly, the assisting moment are reduced. The resultant moment becomes smaller than the load moment, and the mechanical tone generator 48 makes the pedal rod 57 pushed down. The mechanical tone generator 48 causes the tone or tones to be decayed, and the damper pedal 56 returns to the rest position.

As will be understood from the foregoing description, the power assisting units 103C supplements the foot force with the assisting force, and makes it possible lightly to move the pedals 56. Even if the pianist is a child or a physically handicapped person, he or she can quickly steps on the pedals 56 during the performance.

Third Embodiment

Figure 13:
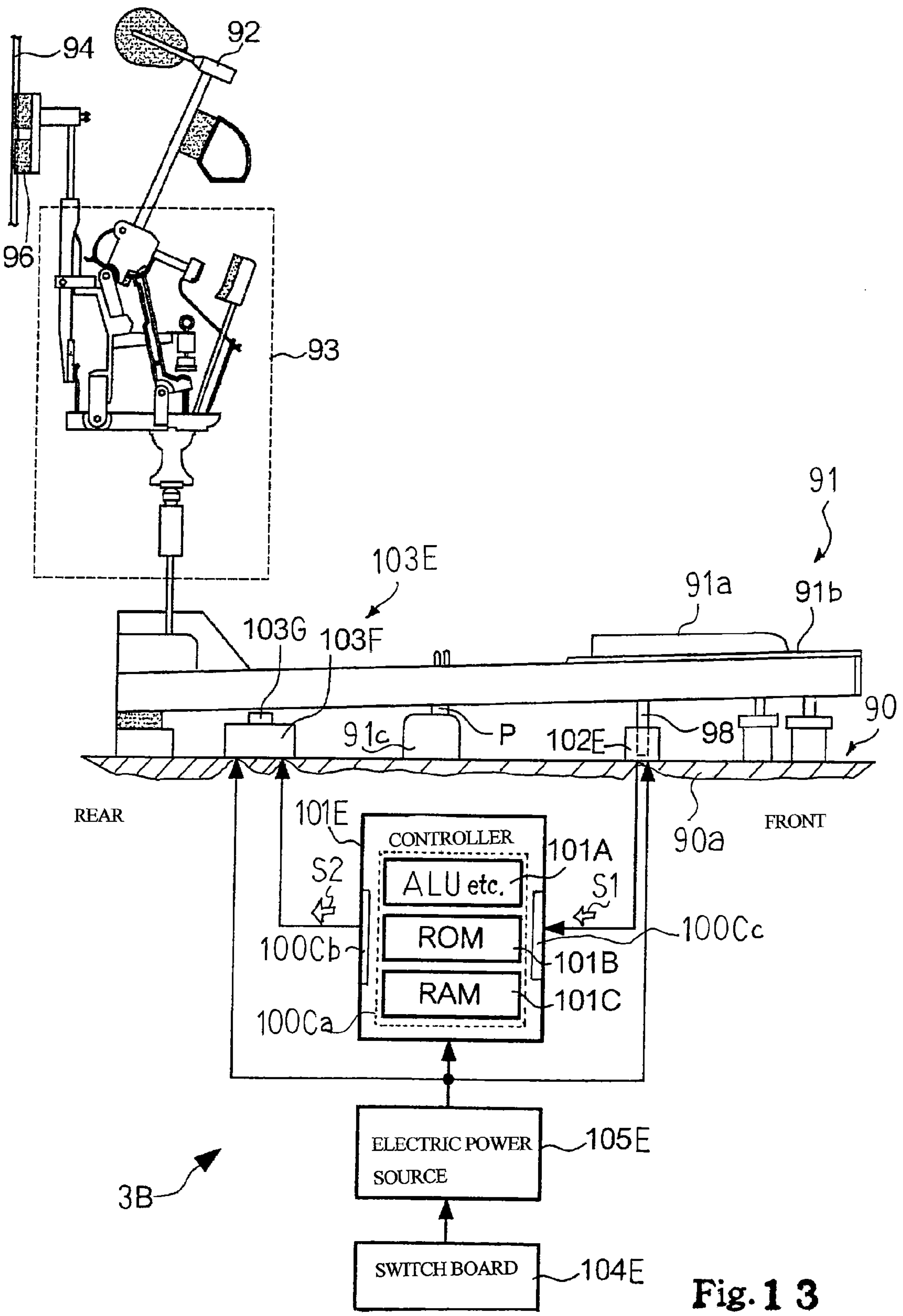
FIG. 13 is a schematic side view showing the structure of an upright piano according to the present invention.

Turning to FIG. 13 of the drawings, an upright piano embodying the present invention largely comprises a piano cabinet 90, a keyboard 91, hammers 92, action units 93, strings 94, dampers 96 and a supporting system 3B. The keyboard 91 is mounted on a flat portion of the piano cabinet 90, and the hammers 92, action units 93, strings 94 and dampers 96 are accommodated in the piano cabinet 90. The keyboard 91 is linked with the action units 93, which in turn are respectively linked with the hammers 92. The strings 94 are opposed to the hammers 92, respectively. The dampers 96 are linked with the keyboard 91, and respectively associated with the strings 94.

The keyboard 91 has plural black keys 91*a*, plural white keys 91*b* and a balance rail 91*c*, and the black keys 91*a* and white keys 91*b* are laid on the well-known pattern. A key bed 90*a* serves as the flat portion of the piano cabinet 90, and the balance rail 91*c* extends on the key bed 90*a* in the lateral direction. Balance pins P are upright on the balance rail 91*c*, and loosely pass through the black and white keys 91*a* and 91*b*, respectively. The balance pins P offer fulcrums to the black and white keys 91*a* and 91*b* so that the black and white keys 91*a* and 91*b* pitch up and down on the balance rail 91*c*.

While a pianist is performing a piece of music on the keyboard 91, the dampers 96 are selectively spaced from and brought into contact with the associated strings 94, and the action units 93 make the associated hammers 92 driven for rotation toward the associated strings 94. When the dampers 96 are spaced from the strings 94, the strings 94 are allowed to vibrate. The hammers 92 are brought into collision with the strings, which have already gotten ready to vibrate, at the end of the rotation, and give rise to the vibrations of the strings 94. Piano tones are radiated through the vibrations of a sound board (not shown) which is resonant with the vibrations of the strings 94. The hammers 92 rebound on the strings 94 after the collisions. When the pianist releases the depressed keys 91*a* and 91*b*, the action units 93, hammers 92 and dampers 96 exert their weight on the rear portions of the black and white keys 91*a*/91*b*, and make the black and white keys 91*a*/91*b* return to the rest positions. Accordingly, the dampers 96 are brought into contact with the vibrating strings 94, again, and the piano tones are decayed.

The force exerted on the rear portions of black and white keys 91*a*/91*b* is hereinafter referred to as "load force", and the load force gives rise to "load moment" in the counter clockwise direction in FIG. 13. The pianist exerts the finger force on the front portion of black and white keys 91*a*/91*b*, and gives rise to the finger moment of the black and white keys 91*a*/91*b* in the clockwise direction.

The supporting system 3B is provided for the black and white keys 91*a* and 91*b*, and assists the pianist in depressing the black and white keys 91*a* and 91*b*.

The supporting system 3B includes pushers 98, a controller 101E, pressure sensors 102E, solenoid-operated actuators 103E, a switch board 104E and an electric power source 105E. The pushers 98 are connected to the lower surfaces of the black and white keys 91*a*/91*b*, and downwardly project from the black and white keys 91*a*/91*b*. The switch board 104E is connected to the electric power source 105E, and the electric current is distributed from the electric power source 105E to the controller 101E, sensors 102E and current driving circuits (not shown), which are connected to the solenoid-operated actuators 103E.

The pressure sensors 102E are provided in association with the pushers 98, and convert the pressure, which is applied with the pushers 98, to detecting signals S1. Each of the solenoid-operated actuators 103E has a solenoid wound on a yoke 103F and a plunger 103G, and the electric current is supplied from the current driving circuit (not shown) to the solenoid wound on yoke 103F under the control with a control signal S2. The plunger 103G exerts the assisting force on the rear portion of black and white keys 91*a*/91*b*, and the assisting force gives rise to the assisting moment in the clockwise direction.

The controller 101E, pressure sensors 102E, switch board 104E and electric power source 105E are similar to the controller 101C, pressure sensors 102C, switch board 104C and electric power source 105C, respectively, and, for this reason, no further description is hereinafter made on those system components 101E, 102E, 104E and 105E for the sake of simplicity.

A conversion table TB3 is created in the read only memory 101C in the controller 101E. The conversion table TB3 makes the pressure applied to the pressure sensor 102E correlated with the amount of current to be supplied to the solenoid wound on yoke 103F. When the pressure is increased from e1 through e2, e3 and e4 to e5, the amount of current is increased from f1 through f2, f3 and f4 to f5.

While the on-off switch on the switch board 104E is found at the off-position, any electric current is not supplied from the electric power source 105E to the controller 101E, pressure sensors 102E and current driving circuits (not shown). Any assisting force is not exerted on the black and white keys 91*a* and 91*b*. The pianist selectively exerts the finger force on the front portions of black and white keys 91*a*/91*b* during the performance. When the finger moment exceeds the load moment, the front portions of black and white keys 91*a*/91*b* start to sink toward the key bed 90*a*, and the depressed keys 91*a*/91*b* actuate the associated action units 93 and dampers 96.

The pianist is assumed to change the on-off switch to the on-position. The electric power source 105E starts to supply the electric current to the controller 101E, pressure sensors 102E and solenoid-operated actuators 103E. While the pianist is performing a music tune on the keyboard 91, the supporting system 3B assists the pianist in depressing the black and white keys 91*a*/91*b*.

The pianist is assumed to exert the finger force on the front position of a white key 91*b*. The finger force is transmitted to the pressure sensor 102E by means of the pusher 98. The detecting signal S1, which represents the pressure equivalent to the finger force, is supplied from the pressure sensor 102E to the controller 101E. The detecting signal S1 is converted to the digital detecting signal, and the conversion table TB3 is accessed with the piece of pressure data. If the pressure is e1, e2, e3, e4 or e5, the corresponding amount of current f1, f2, f3, f4 or f5 is read out from the conversion table TB3, and the control signal S2 representative of the amount of current f2, f2, f3, f4 or f5 is supplied to the current driving circuit (not shown). The driving current is supplied from the current driving circuit (not shown) to the solenoid-operated actuator 103E for the white key 91*b*.

The driving current flows through the solenoid wound on the yoke 103F, and the electromagnetic force is exerted on the plunger 103G. Then, the plunger 103G is upwardly moved, and pushes the rear portion of the white key 91*b*. The assisting force gives rise to the assisting moment, and the assisting moment is added to the finger moment. When the total of finger moment and assisting moment exceeds the load moment, the white key 91*b* starts to travel toward the end position, and actuates the damper 96 and action unit 93. The damper 96 is spaced from the string 94, and the action unit 93 drives the hammer 92 for rotation toward the string 94. The damper 96 permits the string 94 to vibrate so that the hammer 92 gives rise to the vibrations of string 94 at the collision with the string 94. As a result, the piano tone is produced.

As will be understood, the supporting system 3B adds the assisting moment to the finger moment. Even if the pianist is a child or a physically handicapped person, he or she can perform a music tune as similar to a grown-up person.

Moreover, the child or physically handicapped person can control the loudness of tones through the black and white keys 91*a*/91*b*, because the assisting force is increased together with the finger force.

Fourth Embodiment

Figures 14, 15:
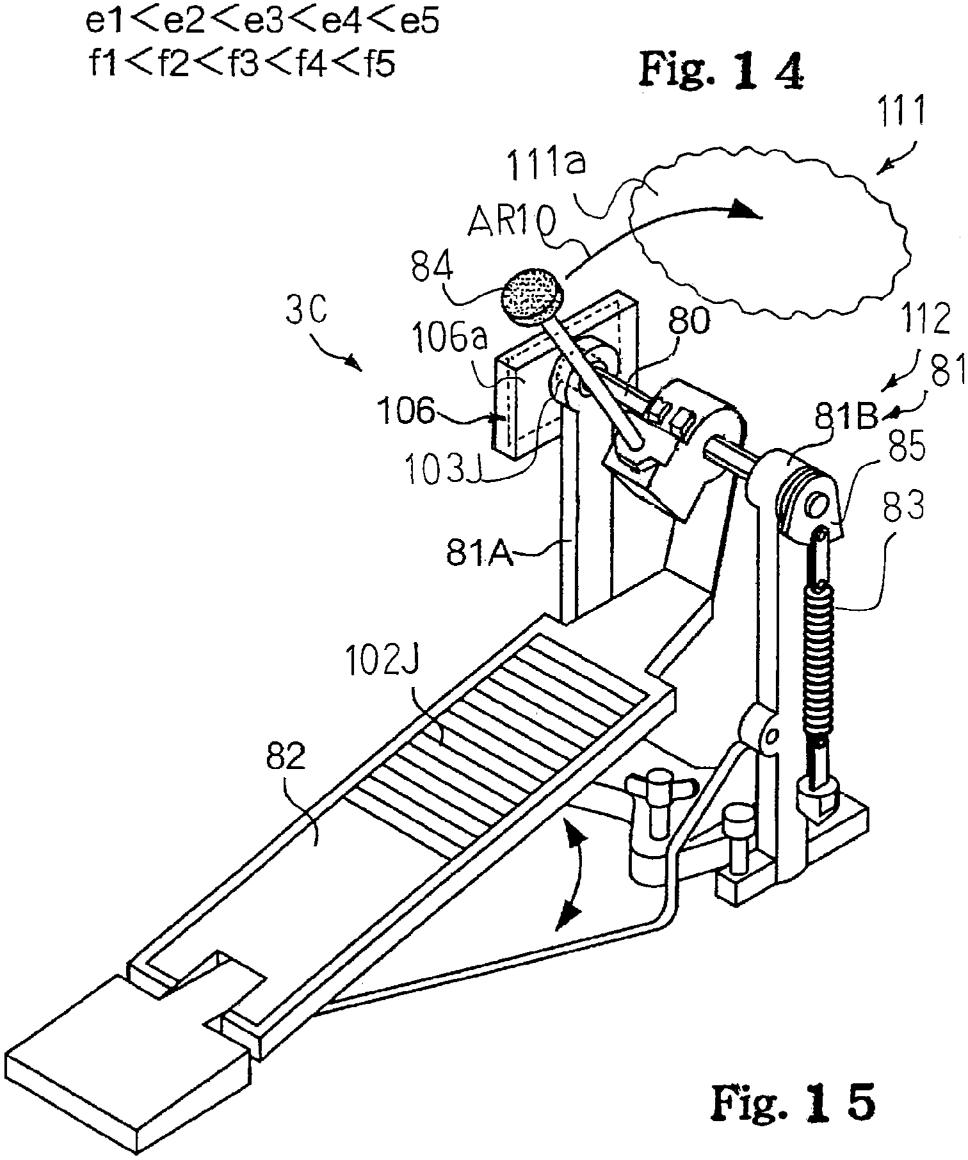
FIG. 14 is a view showing a relation between pressure and the amount of current stored in a conversion table of the supporting system.
FIG. 15 is a perspective view showing a drum pedal of the present invention.

Turning to FIG. 15 of the drawings, a drum embodying the present invention largely comprises a bass drum 111, a foot pedal 112 and a supporting system 3C. The foot pedal 112 is put on a floor together with the bass drum 111, and is opposed to a drum head 111*a* of the bass drum 111. A drummer steps on the foot pedal 112 so as to beat the drum head 111*a* with the foot pedal 112. The supporting system 3C is provided in association with the foot pedal 112, and assists the drummer in beating.

The foot pedal 112 includes a shaft 80, a framework 81, which has a pair of posts 81A/81B, a pedal 82, a coil spring 83, a beater 84 and an arm 85. The pair of posts 81A/81B stands on the floor, and the shaft 80 is rotatably connected between the upper portions of the posts 81A and 81B. The beater 84 is fitted to the shaft 80, and the pedal 82 is connected between the framework 81 and the beater 84. The pedal 82 is rotatable about the frame 81. The arm 85 is secured to the shaft 80, and the coil spring 83 is connected between the arm 85 and the framework 81. The coil spring 83 exerts the elastic force on the arm 85 in the downward direction, and gives rise to the elastic moment exerted on the shaft 80. Thus, the coil spring 83 urges the shaft 80 in a direction opposite to a direction indicated by an arrow AR10 at all times.

The supporting system 3C is assumed to be deactivated. While a drummer is exerting the foot force on the pedal 82, the foot force gives rise to the foot moment about the center axis of the shaft 80. When the foot moment becomes greater than the elastic moment, the shaft 80 is driven for rotation together with the beater 84 in the direction indicated by arrow AR10. The beater 84 is brought into collision with the drum head 111*a*, and gives rise to the drum sound.

If, on the other hand, the supporting system 3C is activated, the assisting moment is added to the foot moment, and the assisting moment is proportionally increased and decreased together with the foot moment. When the total of foot moment and assisting moment becomes greater than the elastic moment, the shaft 80 and, accordingly, the beater 84 start to rotate toward the drum head 111*a*, and the drum sound is generated through the vibrations of the drum head 111*a*.

The supporting system 3C includes a pressure sensor 102J, a power assisting unit 103J and a control box. The pressure sensor 102J is adhered to the upper surface of the pedal 82, and the resistivity of the pressure sensor 102J is varied depending upon the pressure exerted on the pressure sensor 102J. A torque motor forms a part of the power assisting unit 103J, and is connected to the shaft 80. An information processing system 106*a*, an electric power source (not shown) and a switch board (not shown) are incorporated in the control box 106, and the information processing system 106*a* is the origin of information processing capability of the control box 106. A conversion table (not show) is created in a non-volatile memory of the information processing system 106*a*, and relation between the pressure on the pressure sensor 102J and the amount of driving current is defined in the conversion table (not shown) as similar to those in the conversion tables TB1, TB2 and TB3.

While a drummer is keeping the slide knob at the off-position, the drummer drives the pedal 82 only by exerting the foot force on the pedal 82. On the other hand, when the drummer turns on the on-off switch, the pressure sensor 102J, power assisting unit 103J and control unit 106 are energized for exerting the assisting torque on the shaft 80.

The drummer is assumed to exert the foot force on the pedal 82. The pressure on the pressure sensor 102J is converted to the detecting signal, and the detecting signal is supplied to the control box 106. The detecting signal is converted to a digital detecting signal expressing the pressure on the pressure sensor 102J, and the conversion table (not shown) is accessed with the piece of data information expressing the magnitude of the pressure. The control signal expressing the amount of driving current is supplied from the information processing system 106*a* to a current driving circuit (not shown), and the driving signal is adjusted to the amount. The driving signal is supplied to the torque motor of the power assisting unit 103J, and the torque motor gives rise to the assisting moment.

If the total of foot moment and assisting moment is less than the elastic moment, the coil spring 83 keeps the pedal 82 at the rest position. The assisting moment is increased together with the foot moment. When the total of foot moment and assisting moment becomes greater than the elastic moment, the shaft 80 and beater 84 are driven for rotation toward the drum head 111*a*. Thus, the supporting system 3C of the present invention assists the drummer in beating. Even if the drummer is a child or a physically handicapped person, he or she can beat the bass drum 111 by virtue of the supporting system 3C.

Fourth Embodiment

Figure 16:
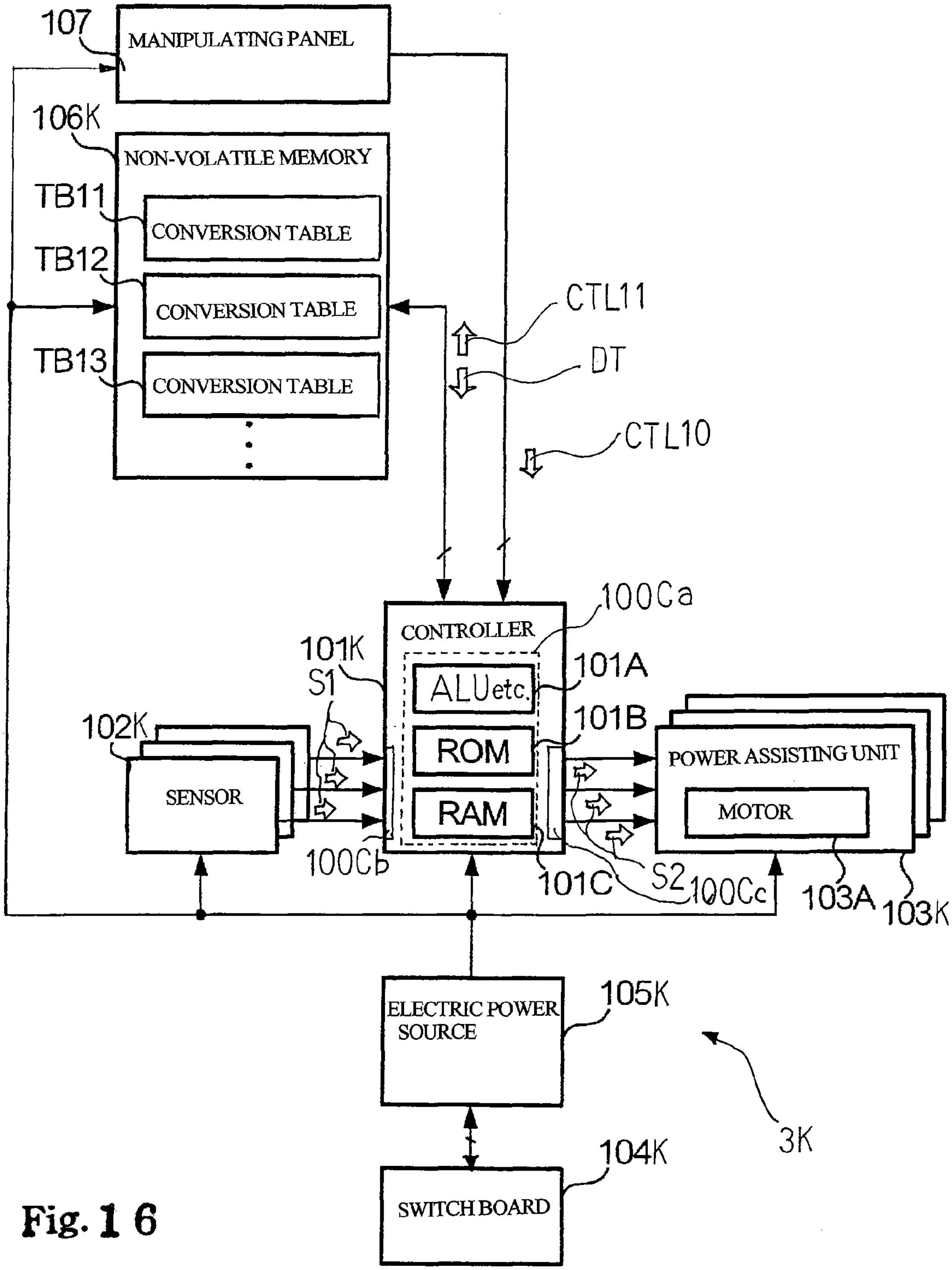
FIG. 16 is a block diagram showing a supporting system of the present invention to be combined with a musical instrument.

Turning to FIG. 16, a supporting system 3K embodying the present invention largely comprises a controller 101K, pressure sensors 102K, power assisting units 103K, a switch board 104K, an electric power source 105K, a non-volatile memory unit 106K and a manipulating board 107. The supporting system 3K is offered to users independently of musical instruments, and the user combine the supporting system 3K with his or her musical instrument. In the following description, description is made on the assumption that the supporting system 3K is designed for a wind musical instrument such as, for example, the saxophone 1.

The controller 101K, pressure sensors 102K, power assisting units 103K, switch board 104K and electric power source 105K are similar to the controller 101, pressure sensors 102J, power assisting units 103, switch board 104 and electric power source 105 except that the conversion table TB1 is not stored in the read only memory 101B. For this reason, the system components of the controller 101K and torque motor of each power assisting unit 103K are labeled with references designating the system components of controller 101 and the torque motor of power assisting unit 103 without detailed description.

The electric power source 105K is further connected to the non-volatile memory unit 106K and manipulating panel 107 so that the electric power is supplied to the non-volatile memory unit 106K and manipulating panel 107. Semiconductor electrically erasable and programmable read only devices are available for the non-volatile memory unit 106K. Plural conversion tables TB11, TB12, TB13, . . . are created in the non-volatile memory unit 106K. Different relations between the pressure and the amount of current are stored in the plural conversion tables TB11, TB12, TB13, . . . , respectively. Even if the pressure has a certain value, the amount of driving current is different among the plural conversion tables TB11, TB12, TB13, . . . . A user who wishes strong assistance selects one of the plural conversion tables TB11, TB12, TB13, . . . , and another user who wishes weak assistance selects another of the plural conversion tables TB11, TB12, TB13, . . . .

On the manipulating board is provided an array of selecting switches which are selectively depressed by a user for selecting one of the plural conversion tables TB11, TB12, TB13, . . . . A user is assumed to depress a switch corresponding to the conversion table TB11. A detecting signal CTL10 indicative of the conversion table TB11 is supplied from the manipulating panel 107 to the controller 101K. The piece of data indicative of the conversion table TB11 is fetched by the information processing system 100Ca, and the information processing system 100Ca sends a control signal CTL11 indicative of the request for transferring the conversion table TB11 to the non-volatile memory unity 106K. The relation between the pressure and the amount of driving current stored in the conversion table TB11 is supplied from the non-volatile memory unit 106K to the controller 101K, and the information processing system 100Ca creates the conversion table TB11 in the random access memory 101C.

While the user is performing a tune on the saxophone 1, the information processing system 100Ca looks up the amount of driving current in the conversion table TB11, and requests the current driving circuit (not shown) to adjust the driving signal to the read-out value.

If the user selects another of the plural conversion tables TB11, TB12, TB13, . . . , the information processing unit looks up the amount of current in selected one of the conversion tables TB11, TB12, TB13, . . . .

As will be appreciated from the foregoing description, the supporting system 3K of the present invention assists a player in performing the musical instrument. The supporting system 3K makes it possible to retrofit a standard musical instrument to the musical instrument of the present invention. Thus, the supporting system 3K is desirable for users who have already had their musical instruments.

Although particular embodiments of the present invention have been shown and described, it will be apparent to those skilled in the art that various changes and modifications may be made without departing from the spirit and scope of the present invention.

The power assisting units 103 may be provided in association with other keys of the key mechanism 2 so that the high-D key 21, high-F key 23 and high-Eb key do not set any limit to the technical scope of the present invention. The power assisting units 103 may be provided for the keys for the little fingers. In case of a baritone saxophone, the cups are large and heavy so that the players appreciate the supporting system 3 for driving the large heavy cups.

The return spring 21G, 23G and 24G do not set any limit to the technical scope of the present invention. Any elastic member or any resilient member is available for the key sub-mechanisms.

The pressure sensors 102, 102C, 102E, 102J and 102K do not set any limit to the technical scope of the present invention. For example, a supporting system of the present invention may have velocity sensors instead of the pressure sensors. The velocity of keys is proportional to the force exerted on the keys so that the information processing system can correlate the velocity with the amount of driving current. Similarly, an acceleration sensor is available for the supporting system.

The torque motor 103A does not set any limit to the technical scope of the present invention. An ultrasonic motor is available for the supporting system of the present invention. Similarly, the solenoid-operated actuators 103D and 103E do not set any limit to the technical scope of the present invention. A polymer actuator, a spiral member of shape memory alloy and a piezoelectric element are available for the supporting system of the present invention.

Although the single conversion table is shared among all the keys or all the pedals during the performance, a supporting system may have plural conversion tables for different keys or different pedals. For example, the relation between the pressure and the amount of driving current is defined in one of the conversion tables for the high-F key, and another relation between the pressure and the amount of driving current is defined in another conversion table for the high-Eb key. Plural time slots are respectively assigned to the detecting signals S1 supplied from the pressure sensors provided for the keys or pedals, and the information processing unit periodically fetches the pieces of data expressing the pressure, and determines the key or pedal on the basis of the time slot. The conversion table for the key or pedal is accessed with the value of pressure. This feature is desirable, because the player feels a certain key or keys to be not easy to depress. In other words, the magnitude of assistance to be required for the player is not same. Strong assistance is defined in the conversion table for the key not easy to depress.

The conversion table or tables may be rewritable. In this instance, a display panel and ten keys are prepared for the conversion table or tables, and a user increases or decreases the amount of driving current displayed on the panel by using the ten keys. The read only memory 101B is to be implemented by electrically erasable and programmable read only memory devices.

In the fifth embodiment, the plural conversion tables TB11, TB12, TB13, . . . are stored in the non-volatile memory unit 106K, and one of the conversion tables is transferred from the non-volatile memory unit 106K to the random access memory 101C. The plural conversion tables TB11, TB12, TB13, . . . may be stored in the read only memory 101B.

The conversion table does not set any limit to the technical scope of the present invention. The relation between the pressure and the amount of driving current may be expressed as an equation. In this instance, when the pressure is known, the amount of driving current is determined through calculation using the equation.

The supporting system 3 may be incorporated in another sort of wind instrument such as, for example, a clarinet, bassoon or an oboe. The supporting system 3A or 3B may be incorporated in another sort of keyboard musical instrument such as, for example, a harpsichord, an organ, a mute piano, an automatic player piano or an electronic keyboard.

The component parts and system components of the above-described embodiments are correlated with claim languages as follows. The saxophone, grand piano, upright piano and drum are examples of a "musical instrument".

The high-D key 21, high-F key 23 and high-Eb key 24, the damper pedal, soft pedal and sostenuto pedal 56, the black keys 91*a* and white keys 91*b* and the pedal 82 serve as "at least one manipulator". The pitch of tones, the length of tones, the loudness of tones and the intervals of beats are examples of an "attribute". The tubular body 1, the mechanical tone generator 48 and pedal linkwork 57, the hammers 92, action units 93, strings 94 and dampers 96 and the bass drum 111, framework 81, shaft 80, coil spring 83 and beater 84 form in combination a "tone generator". The pressure sensors 102, 102C, 102E, 102J and 102K serve as "at least one sensor", and the power assisting units 103, 103D, 103E and 103K serve as "at least one actuator". The pressure is a "physical quantity", and the amount of driving current is equivalent to "driving power".

The return spring 23G, the combination of damper mechanism of mechanical tone generator 48 and linkwork 57, the combination of action units 93 and hammers 92 or coil spring 83 serve as a "sub-system". The coil spring 75 serves as a "load canceller", and the elastic force of the coil spring 75 is equivalent to a "canceling force". The rod 21E, 23E or 24E, pin 76, balance rail 91*c* and balance pins P and a pin of the framework 81 offer a "fulcrum" to the at least one manipulator.

The high-D key 21, high-F key 23 and high-Eb key 24, the damper pedal, soft pedal and sostenuto pedal 56, the black keys 91*a* and white keys 91*b* and the pedal 82 serve as "another manipulator". In the sixth embodiment, the controller 101K and non-volatile memory 106K as a whole constitute a "controller". The manipulating panel 107 serves as a "selecting unit".

What is claimed is:

1. A musical instrument for producing music sound, comprising:

at least one manipulator moved in a certain direction by player's force so as to specify an attribute for the music sound to be produced;

a tone generator connected to said at least one manipulator, and producing said music sound having said attribute, said tone generator having a sub-system exerting a load force on said at least one manipulator in a direction opposite to said certain direction; and a supporting system including at least one sensor provided for said at least one manipulator and producing a detecting signal representative of a physical quantity expressing the movement of said at least one manipulator, at least one actuator responsive to a driving power so as to exert an assisting force in said certain direction on said at least one manipulator, and a controller connected to said at least one sensor and said at least one actuator, said controller receiving said detecting signal representative of said physical quantity from said sensor and supplying said driving power to said actuator, said controller storing a relation between said physical quantity and a magnitude of said driving power, said controller adjusting said driving power to a certain magnitude corresponding to said physical quantity in said relation so that said at least one manipulator starts to move on the condition that a total of said player's force and said assisting force reaches a threshold greater than a load due to said load force.

2. The musical instrument as set forth in claim 1, wherein said at least one manipulator is rotated in said certain direction and said direction opposite to said certain direction about a fulcrum so that said player's force, said assisting force and said load force give rise to player's moment, assisting moment and load moment equivalent to said load, respectively.

3. The musical instrument as set forth in claim 1, further comprising a load canceller exerting a canceling force on said at least one manipulator in said certain direction.

4. The musical instrument as set forth in claim 1, in which another relation between said physical quantity and said magnitude of said driving power is further stored in said controller, and said relation and said another relation are selectively used for determining said certain magnitude.

5. The musical instrument as set forth in claim 4, further comprising a selecting unit connected to said controller so that a player selects said relation for obtaining relatively large assisting force in terms of a certain physical quantity or said another relation for obtaining relatively small assisting force in terms of said certain physical quantity.

6. The musical instrument as set forth in claim 4, further comprising another manipulator connected to said tone generator and moved in said certain direction by said player's force so as to specify said attribute at a value different from the value specified by using said at least one manipulator, wherein said relation and said another relation are used for said at least one manipulator and said another manipulator, respectively.

7. The musical instrument as set forth in claim 1, in which said tone generator gives rise to said music sound through vibrations of a column of air defined therein, and said at least one manipulator changes a pitch of said music sound by varying the length of said column of air.

8. The musical instrument as set forth in claim 7, in which said tone generator is formed with plural tone holes, and said at least one manipulator and other manipulators are used for selectively closing and opening said plural tone holes.

9. The musical instrument as set forth in claim 1, in which said tone generator has action units linked with plural keys and selectively activated by the associated keys, strings vibratory for producing tones forming said music sound, hammers respectively opposed to said strings and driven for rotation by the activated action units so as to be brought into collision with the associated strings at the end of said rotation, and dampers linked with said plural keys and at least one pedal, spaced from and brought into contact with said strings depending upon the movements of said plural keys.

10. The musical instrument as set forth in claim 9, in which at least one pedal serves as said at least one manipulator.

11. The musical instrument as set forth in claim 9, in which one of said keys serves as said at least one manipulator.

12. The musical instrument as set forth in claim 1, in which said tone generator includes a drum having a vibratory drum head, a beater driven for rotation by said at least one manipulator and brought into collision with said vibratory drum head at an end of said rotation, and a framework opposed to said drum and rotatably supporting said beater.

13. A supporting system for assisting a player in performance on a musical instrument, comprising:

at least one sensor provided for at least one manipulator of said musical instrument, and producing a detecting signal representative of a physical quantity expressing a movement of said at least one manipulator in a certain direction against a load force exerted thereon in a direction opposite to said certain direction by means of a sub-system of said musical instrument;

at least one actuator responsive to a driving power so as to exert an assisting force on said at least one manipulator in said certain direction; and a controller connected to said at least one sensor and said at least one actuator, said controller receiving said detecting signal representative of said physical quantity from said sensor and supplying said driving power to said actuator, said controller storing a relation between said physical quantity and a magnitude of said driving power, said controller adjusting said driving power to a certain magnitude corresponding to said physical quantity in said relation so that said at least one manipulator starts to move on the condition that a total of said player's force and said assisting force reaches a threshold greater than a load due to said load force.

14. The supporting system as set forth in claim 13, wherein said at least one manipulator is rotated in said certain direction and said direction opposite to said certain direction about a fulcrum so that said player's force, said assisting force and said load force give rise to player's moment, assisting moment and load moment equivalent to said load, respectively.

15. The supporting system as set forth in claim 13, said musical instrument further comprises a load canceller exerting a canceling force on said at least one manipulator in said certain direction.

16. The supporting system as set forth in claim 13, in which another relation between said physical quantity and said magnitude of said driving power is further stored in said controller, and said relation and said another relation are selectively used for determining said certain magnitude.

17. The supporting system as set forth in claim 16, further comprising a selecting unit connected to said controller so that a player selects said relation for obtaining relatively large assisting force in terms of a certain physical quantity or said another relation for obtaining relatively small assisting force in terms of said certain physical quantity.

18. The supporting as set forth in claim 16, in which said musical instrument further comprises another manipulator connected to a tone generator in parallel to said at least one manipulator and moved in said certain direction by said player's force so as to specify said attribute at a value different from the value specified by using said at least one manipulator, wherein said relation and said another relation are used for said at least one manipulator and said another manipulator, respectively.

* * * * *